US011180125B2

United States Patent
Yao et al.

(10) Patent No.: US 11,180,125 B2
(45) Date of Patent: Nov. 23, 2021

(54) REGENERATIVE BRAKING/ANTI-LOCK BRAKING CONTROL SYSTEM

(71) Applicant: FORD GLOBAL TECHNOLOGIES, LLC, Dearborn, MI (US)

(72) Inventors: Yixin Yao, Ann Arbor, MI (US); Yanan Zhao, Ann Arbor, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 307 days.

(21) Appl. No.: 16/576,233

(22) Filed: Sep. 19, 2019

(65) Prior Publication Data

US 2021/0086736 A1    Mar. 25, 2021

(51) Int. Cl.
*B60T 8/1761*     (2006.01)
*B60L 7/18*       (2006.01)
(Continued)

(52) U.S. Cl.
CPC ............ *B60T 8/17613* (2013.01); *B60L 7/18* (2013.01); *B60T 13/665* (2013.01); *B60W 20/14* (2016.01); *B60W 30/18127* (2013.01)

(58) Field of Classification Search
CPC ............... B60T 8/17613; B60T 16/665; B60T 2270/60; B60T 2270/602; B60T 2270/613;
(Continued)

(56) References Cited

U.S. PATENT DOCUMENTS 5,476,310 A    12/1995   Ohtsu et al.
5,615,933 A     4/1997   Kidston et al.
(Continued)

FOREIGN PATENT DOCUMENTS

JP          14079099 A      5/2014

OTHER PUBLICATIONS

Oleksowicz, Selim, et al. "Regenerative braking control for high level deceleration on low mu surface." SAE International Journal of Alternative Powertrains 4.1 (2015): 209-224.
Oleksowicz, Selim, Keith Burnham, and Andrzej Gajek. "On the legal, safety and control aspects of regenerative braking in hybrid/electric vehicles." Czasopismo Techniczne. Mechanika 109.3-M (2012): 139-155.
(Continued)

*Primary Examiner* — Thomas W Irvin
(74) *Attorney, Agent, or Firm* — David B Kelley; Brooks Kushman P.C.

(57) ABSTRACT

A vehicle includes an axle, an electric machine, a first wheel, a second wheel, a first friction brake, a second friction brake, and a controller. The controller is programmed to, in response to and during an anti-locking braking event, generate first and second signals indicative of a braking torque demand at the first and second wheels, respectively, based on a difference between a desired wheel slip ratio and an actual wheel slip ratio of the first and second wheels, respectively, adjust a regenerative braking torque of the electric machine based on a product of the first signal and a regenerative braking weighting coefficient, adjust a first friction braking torque based on a product of the first signal and a friction braking weighting coefficient, and adjust a second friction braking torque based on the second signal and dynamics of the first and second output shafts.

20 Claims, 23 Drawing Sheets

(51) Int. Cl.
  *B60T 13/66* (2006.01)
  *B60W 20/14* (2016.01)
  *B60W 30/18* (2012.01)
(58) Field of Classification Search
  CPC . B60L 7/18; B60L 7/26; B60W 20/14; B60W 30/18127
  See application file for complete search history.

(56) References Cited

U.S. PATENT DOCUMENTS

| | | | |
|---|---|---|---|
| 6,231,134 B1 | 5/2001 | Fukasawa et al. | |
| 6,709,075 B1* | 3/2004 | Crombez | B60T 8/17636 |
| | | | 303/152 |
| 7,152,934 B2 | 12/2006 | Fuhrer et al. | |
| 7,794,026 B2* | 9/2010 | Nakayama | B60T 8/1706 |
| | | | 303/113.1 |
| 9,193,339 B2 | 11/2015 | Yao et al. | |
| 9,586,488 B2* | 3/2017 | Nakaoka | B60W 10/188 |
| 10,399,440 B2* | 9/2019 | Zhao | B60T 1/10 |
| 10,723,229 B1* | 7/2020 | Yao | B60L 3/108 |
| 2006/0138859 A1* | 6/2006 | Nakayama | B60T 8/4266 |
| | | | 303/113.1 |
| 2007/0046099 A1* | 3/2007 | Matsuura | B60W 10/184 |
| | | | 303/152 |
| 2015/0149056 A1* | 5/2015 | Yao | B60T 13/585 |
| | | | 701/71 |
| 2015/0274159 A1* | 10/2015 | Lu | B60W 30/02 |
| | | | 701/82 |
| 2016/0096434 A1* | 4/2016 | Nakaoka | B60L 3/108 |
| | | | 701/78 |
| 2016/0264111 A1 | 9/2016 | Doi et al. | |
| 2018/0093571 A1* | 4/2018 | Hall | B60T 1/10 |
| 2018/0154777 A1* | 6/2018 | Hall | B60L 7/26 |
| 2018/0264949 A1 | 9/2018 | Kaneko et al. | |
| 2018/0354495 A1* | 12/2018 | Kumazaki | B60K 6/365 |
| 2018/0361856 A1* | 12/2018 | Zhao | B60W 10/10 |
| 2019/0039450 A1* | 2/2019 | Baba | B60W 10/08 |
| 2021/0053448 A1* | 2/2021 | Beck | B60W 50/00 |
| 2021/0086623 A1* | 3/2021 | Yao | B60W 30/18172 |
| 2021/0221343 A1* | 7/2021 | Yao | B60L 7/26 |
| 2021/0237614 A1* | 8/2021 | Yao | B60L 15/20 |

OTHER PUBLICATIONS

Ivanov, Valentin, et al. "Design and testing of ABS for electric vehicles with individually controlled on-board motor drives." SAE International Journal of Passenger Cars—Mechanical Systems 7.2014-01-9128 (2014): 902-913.

R. Kubaisi, "Adaptive Regenerative Braking in Electric Vehicles", PhD. Thesis, Karlsruher Institut für Technologie (KIT), Dec. 2018.

49 CFR Part 571 Part 571, 49 CFR 571 135—Standard No. 135; Light vehicle brake systems Federal Motor Vehicle Safety Standards.

European Directive 71/320/EEC. Council Directive 2006/96/EC of 20, Nov. 2006, L 363 81.

ECE 13-H. Passenger cars with regards to braking. United Nations Rev.2/Add.12H/Amend. 4 of 6, Aug. 2007.

Oleksowicz, Selim, et al. "Legal, Safety and Practical Regenerative Braking Control Challenges." Measurement and Control 46.9 (2013): 283-288.

Khaleghian, Seyedmeysam, Anahita Emami, and Saied Taheri. "A technical survey on tire-road friction estimation." Friction 5.2 (2017): 123-146.

Oleksowicz, S. A., et al. "Investigation of regenerative and anti-lock braking interaction." International Journal of Automotive Technology 14.4 (2013): 641-650.

Oleksowicz, Selim A., et al. "Regenerative braking strategies, vehicle safety and stability control systems: critical use-case proposals." Vehicle System Dynamics 51.5 (2013): 684 699.

Fuentes, L.V., Regenerative Braking Systems, Universidad Pontificia Comillas ICAI-ICADE, May 2014.

Reif K. (Ed.), "Brakes, Brake Control and Advanced Driver Assistance Systems", Springer Verlag, 2014, 14 pages.

Wen-Po Chiang, et al., "Integrated Slip-Based Torque Control of Antilock Braking System for In-Wheel Motor Electric Vehicle", IEE Journal of Industry Applications, vol. 3, No. 4, pp. 318-327, 2014, 10 pages.

Dzmitry Savitski et al., "The New Paradigm of Anti-Lock Braking System for Full Electric Vehicle: Experimental Investigation and Benchmarking", Proceedings of the Institution of Mechanical Engineers Part D Journal of Automobile Engineering, Oct. 2015, 14 pages.

\* cited by examiner

REGENERATIVE BRAKING/ANTI-LOCK BRAKING CONTROL SYSTEM

TECHNICAL FIELD

The present disclosure relates to hybrid/electric vehicles and methods of controlling regenerative braking in hybrid/electric vehicles.

BACKGROUND

Regenerative braking is a feature of hybrid vehicles that improves fuel economy by recapturing kinetic energy when the vehicle slows down during a braking event. During regenerative braking, an electric machine may operate as a generator to convert the kinetic energy of the vehicle into electrical energy which is in turn used to charge a battery.

SUMMARY

A vehicle includes an axle, an electric machine, a first wheel, a second wheel, a first friction brake, a second friction brake, and a controller. The axle has an open differential, an input shaft to the differential, and first and second output shafts from the differential. The first and second output shafts are asymmetrical. The electric machine is secured to the input shaft and is configured to recharge a battery during regenerative braking. The first and second wheels are secured to the first and second output shafts, respectively. The first and second friction brakes are configured to apply torque to the first and second wheels, respectively, to slow the vehicle. The controller is programmed to, in response to and during an anti-locking braking event, generate a first signal indicative of a braking torque demand at the first wheel based on a difference between a desired wheel slip ratio and an actual wheel slip ratio of the first wheel, generate a second signal indicative of a braking torque demand at the second wheel based on a difference between a desired wheel slip ratio and an actual wheel slip ratio of the second wheel, adjust a regenerative braking torque of the electric machine based on a product of the first signal and a regenerative braking weighting coefficient to maintain or drive actual wheel slip at or toward the desired wheel slip, adjust a first friction braking torque of the first friction brake based on a product of the first signal and a friction braking weighting coefficient to maintain or drive actual wheel slip at or toward the desired wheel slip, and adjust a second friction braking torque of the second friction brake based on the second signal and transfer functions that represent dynamics of the first and second output shafts.

A vehicle includes a drivetrain, an electric machine, a first wheel, a second wheel, a first friction brake, a second friction brake, and a controller. The drivetrain has a transmission, a differential, an input shaft to the differential, first and second output shafts from the differential. The output of the transmission is connected to the input shaft. The first and second output shafts are asymmetrical. The electric machine is secured to an input of the transmission and is configured to recharge a battery during regenerative braking. The first and second wheels secured to the first and second output shafts, respectively. The first and second friction brakes configured to apply torque to the first and second wheels, respectively, to slow the vehicle. The controller is programmed to, in response to and during an anti-locking braking event, generate a first signal indicative of a braking torque demand at the first wheel based on a difference between a desired wheel slip ratio and an actual wheel slip ratio of the first wheel, generate a second signal indicative of a braking torque demand at the second wheel based on a difference between a desired wheel slip ratio and an actual wheel slip ratio of the second wheel, adjust a regenerative braking torque of the electric machine based on a product of the first signal and a regenerative braking weighting coefficient to maintain or drive actual wheel slip at or toward the desired wheel slip, adjust a first friction braking torque of the first friction brake based on a product of the first signal and a friction braking weighting coefficient to maintain or drive actual wheel slip at or toward the desired wheel slip, and adjust a second friction braking torque of the second friction brake based on the second signal and transfer functions that represent the dynamics of the first and second output shafts. The regenerative braking weighting coefficient is based on a ratio between a maximum braking torque of the electric machine and the total torque demand.

A vehicle includes a drivetrain, an electric machine, a first wheel, a second wheel, a first friction brake, a second friction brake, and a controller. The drivetrain has a driveshaft, a first half shaft, and a second half shaft. The first and second half shaft are asymmetrical. The first and second wheels are secured to the first and second half shafts, respectively. The electric machine is connected to the driveshaft. The first and second friction brakes are connected to the first and second wheels, respectively. The controller is programmed to, in response to and during an anti-locking braking event, generate a first signal indicative of a braking torque demand at the first wheel based on a difference between a desired wheel slip ratio and an actual wheel slip ratio of the first wheel, generate a second signal indicative of a braking torque demand at the second wheel based on a difference between a desired wheel slip ratio and an actual wheel slip ratio of the second wheel, determine a regenerative braking weighting coefficient based on a ratio between a maximum braking torque of the electric machine and a braking torque threshold that corresponds with the wheels becoming locked, determine a friction braking weighting coefficient based on the regenerative braking weighting coefficient, adjust a regenerative braking torque of the electric machine based the first signal and the regenerative braking weighting coefficient during the anti-lock braking event to maintain or drive actual wheel slip at or toward the desired wheel slip, adjust a first friction braking torque of the first friction brake based on the first signal and the friction braking weighting coefficient weighting coefficient, and adjust a second friction braking torque of the second friction brake based on the second signal and transfer functions that represent the dynamics of the first and second half shafts.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
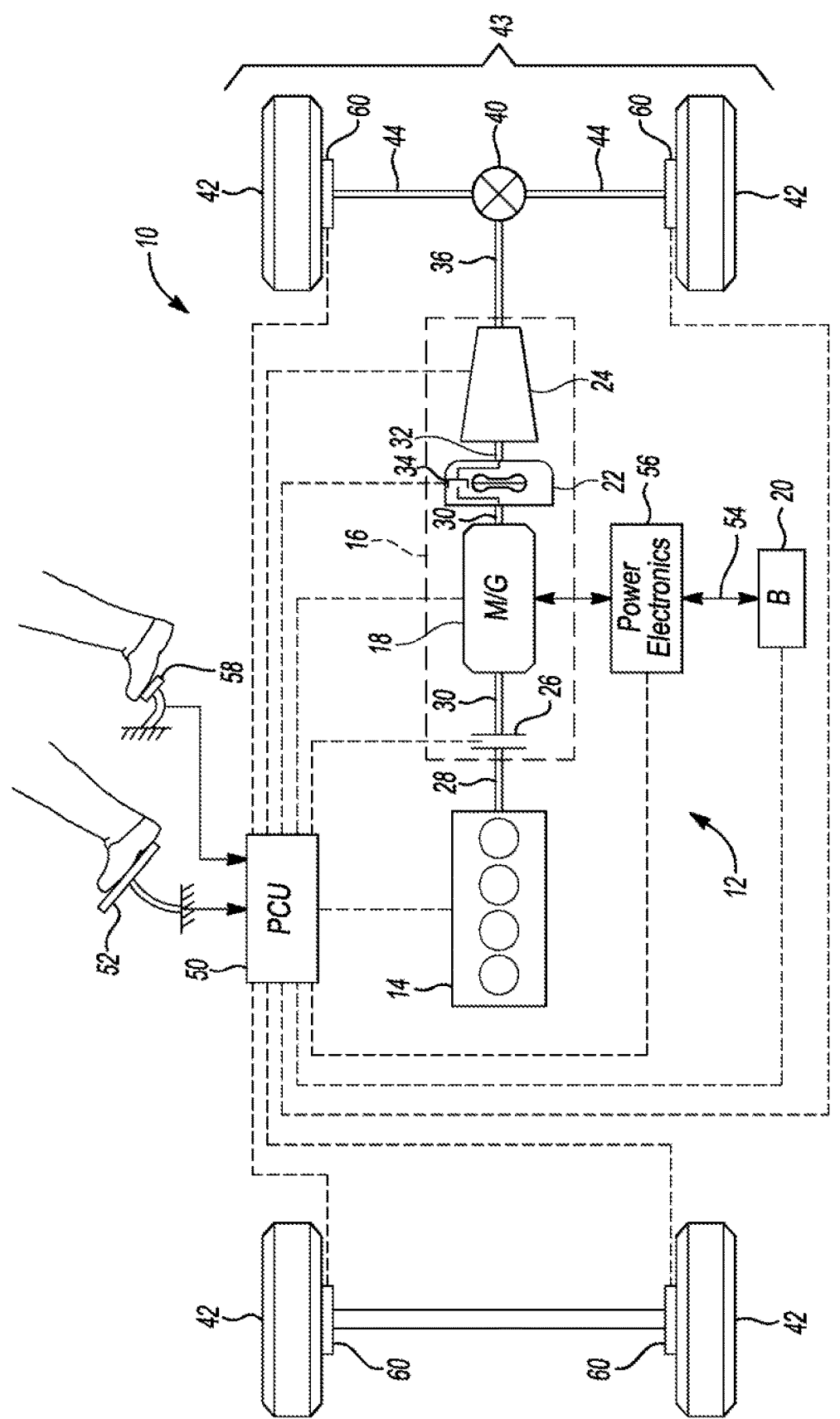
FIG. 1 is a schematic illustration of an exemplary powertrain of a hybrid/electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). For example, the gearbox 24 may be upshifted from a lower gear to a higher gear (e.g., from $3^{rd}$ gear to $4^{th}$ gear) during acceleration or may be downshifted from a higher gear to a lower gear (e.g., from $5^{th}$ gear to $4^{th}$ gear) when the vehicle is slowing down. Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective half shaft 44 connected to the differential 40. The differential 40 may be an open differential. The transmission output shaft 36 may also be referred to as an input shaft to the differential 40 and the half shafts 44 may be referred to as an output from the differential. Shaft 36, differential 40, half shafts 44 and a pair of the wheels 42 may form an axle 43. The half shafts 44 may be asymmetrical relative to each other. For example, the length and/or the diameter of each half shaft 44 may be different than the length and/or diameter of the other half shaft 44. The vehicle may also include a second pair of wheels 42 that are not part of axle 43. The differential transmits approximately equal torque to each wheel 42 while permitting slight speed differences such as when the vehicle turns a corner. Each of the wheels 42 have tires that contact the road surface to propel the HEV 10. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60, which may be disposed about each wheel 42. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking where the M/G 18 is utilized to slow the HEV 10. During regenerative braking torque and rotational energy or power from spinning wheels 42 is transferred back through the gearbox 24, torque converter 22, (and/or torque converter bypass clutch 34) and is converted into electrical energy for storage in the battery 20.

Referring to FIG. 1, a schematic diagram representative of a vehicle 10 and a vehicle powertrain 12 is illustrated. The powertrain 12 includes power generating components (e.g., engines or electric motors) and the drivetrain. The drivetrain is the group of components that deliver power to the driving wheels (e.g., gearbox 24, shaft 36, differential 40, and half shafts 44), excluding the power generating components. In contrast, the powertrain 12 is considered to include both the power generating components and the drivetrain. The powertrain 12 includes an engine 14 and a transmission 16. The transmission 16 may be configured to provide multiple gear ratios between an input and an output of the transmission 16. The engine 14 is connected to the input of the transmission 16 while drivetrain components that are configured deliver power to driving wheels 18 are connected to an output shaft 20 of the transmission 16. The engine 14 may be connected to the input of the transmission by a torque converter or a launch clutch.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

For example, the configuration may include a single electric machine (e.g., M/G 18) that is connected to an open differential (e.g., differential 40) through an input shaft to the differential (i.e., shaft 36) and may include first and second wheels (i.e., wheels 42) that are each secured to one of the two output shafts of the open differential (i.e., half shafts 44). In this example, the open (or unlocked) differential is configured to provide the same torque (rotational force) to each of the half shafts and their respective wheels. A transmission (e.g., gearbox 24) and/or torque converter (e.g., torque converter 22) may be disposed between the electric machine and the open differential in this example configuration.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

Figure 2:
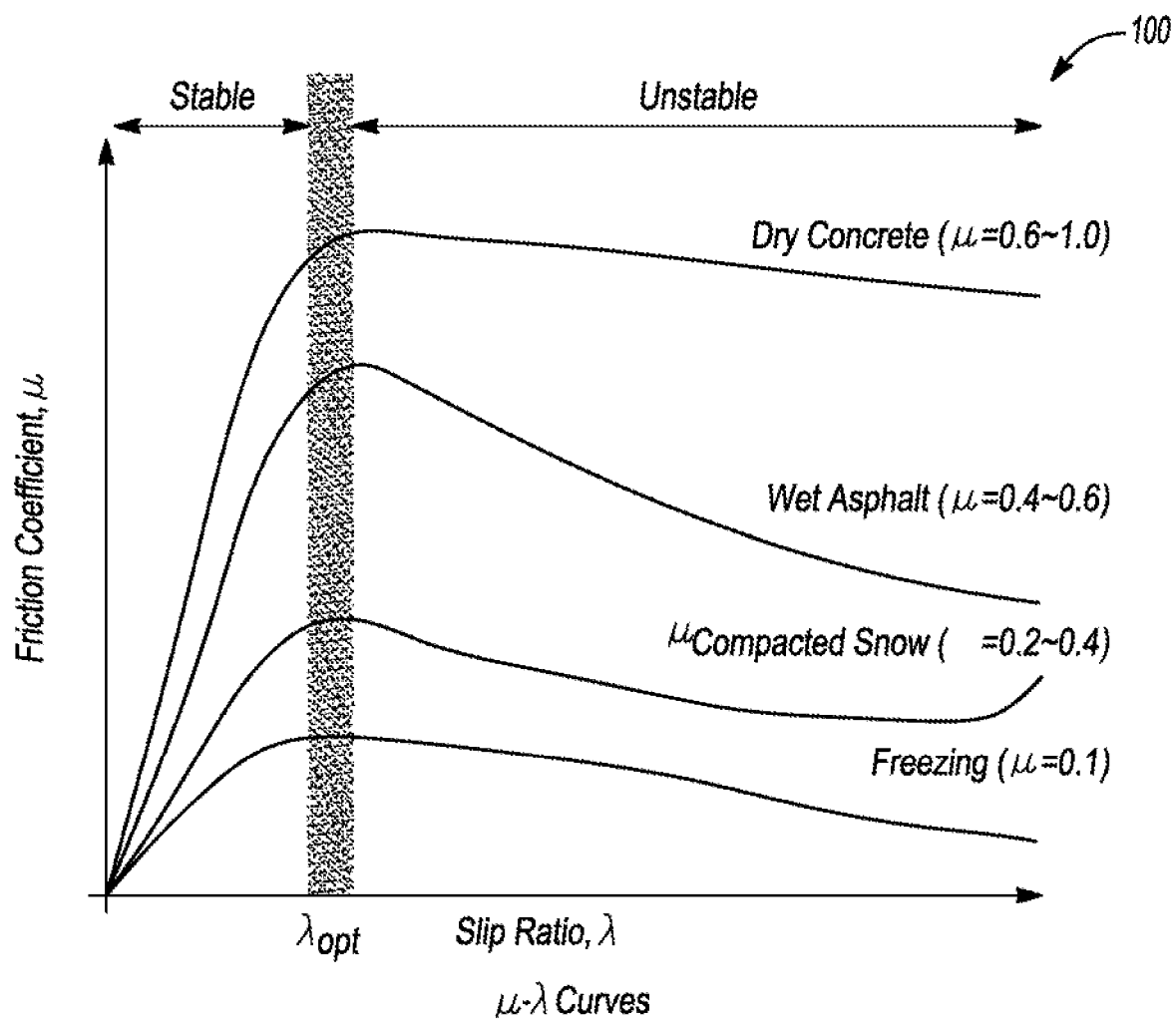
FIG. 2 is a graph that represents the relationship between the coefficient of friction between vehicle wheels and the road surface and the slip ratio of the vehicle.

Referring to FIG. 2, a graph 100 that represents the relationship between the coefficient of friction between the vehicle wheels and the road surface, $\mu$, and the slip ratio of the vehicle, $\lambda$, under various road surface/conditions (e.g., dry concrete, wet asphalt, compacted snow, and freezing/icy roads) is illustrated. The slip ratio of the vehicle, λ, may be defined by equation (1):

$$\lambda = \frac{V_w - V_c}{V_w} \quad (1)$$

where $V_w$ is the speed of one or more of the wheels 42 and $V_c$ is the speed of the vehicle 10.

Graph 100 illustrates that as the slip ratio, λ, increases, the stability (e.g., the ability to steer the vehicle in a desired direction) of the vehicle decreases. Increasing the slip ratio, λ, may also result in increasing the stopping distance of the vehicle. Increasing the slip ratio, λ, may be caused by an application of the friction brakes 60 that results in a locking of the wheels 42. In vehicles that include an Anti-lock Brake System (ABS), the ABS prevents the wheels 42 from locking up and reduces the total braking distance. When wheel lockup is detected based on estimating the slip ratio, λ, utilizing equation 1 above, the ABS reduces the pressure applied to the brake actuators (e.g., pneumatic or hydraulic pistons) and returns the wheels to a spinning state. The vehicle 10 may include sensors that measure wheel speed and vehicle speed, which are then applied to equation 1 to estimate the slip ratio, λ. ABS can maximize the longitudinal tire-road friction while keeping large lateral forces. ABS is generally achieved through the control of hydraulic or pneumatic pressure for mechanical wheel brake actuators. ABS may pulse the pressure of the actuators such that the torque applied to the friction brakes increases and decreases cyclically (i.e., oscillates) along a wave function, such as a sine wave. This allows the vehicle operator to control (e.g., steer) the vehicle while maintaining the desired braking operation. During an anti-lock braking operation, an anti-lock braking controller may drive the slip ratio, λ, to an optimal band of slip ratios, $\lambda_{opt}$, that is between stable and unstable slip ratio values, λ.

Driveline configurations of Electric Vehicles (EVs) and Hybrid Electric Vehicles (HEVs) may impact the performance of regenerative braking. For example, regenerative braking may cause an unequal lateral torque distribution in vehicles having a single electric machine that is attached to input of an open differential where the outputs of the open differential are asymmetrical axles (e.g., half shafts 44) having different lengths that are each connected to a wheel (e.g., wheels 42) of the vehicle 10.

Returning to FIG. 1, a four-channel ABS system may allocate a different friction brake torque valve for each wheel. The friction brake torque may be applied directly and independently to each wheel. The regen braking torque, generated by the electric motor and delivered by driveline shaft (i.e., shaft 36) and right/left half shafts (i.e., shafts 44), is applied to both of left and right wheels 42 of axle 43. Within the driveline system (i.e., shaft gearbox 24, shaft 36, differential 40, half shafts 44, and wheels 42) exists shaft compliance, typical friction, time delay, and bearing resistance. In other words, nonlinear dynamics exists between the regenerative braking torque source (i.e., M/G 18) and the wheel/road surface. In addition, the left and right axial drive shafts (i.e., half shafts 44) characteristics may not be completely same, which may result in an asymmetry in torque delivery to the separate wheels 42.

This disclosure describes a method for integrating regenerative braking control and friction braking control in order to recuperate the maximum kinetic energy during an ABS event for vehicles having asymmetrical axle shafts (e.g., half shafts 44), a single motor, and an open differential. The system includes allowing the ABS system or controller to have control over the regenerative braking torque, maintaining a required wheel slip, and maintaining the same vehicle stop distance as if the vehicles were being braked solely with the friction brakes via ABS control. The approached problem may be referred to as the RBS-ABS Event, and solutions to the problem may be referred to as RBS-ABS Event controls or methods.

In the following description, variables with L or R subscription represent variables relative to the left wheel or the right wheel, respectively, while variables without an L or R subscription represent variable relative to both wheels collectively. For example, $T_{brakeL}$ and $T_{brakeR}$ represent the friction braking torque of the left and right wheels, respectively, while $T_{brake}$ represents the total collective friction braking torque of the right and left wheels.

Figure 3:
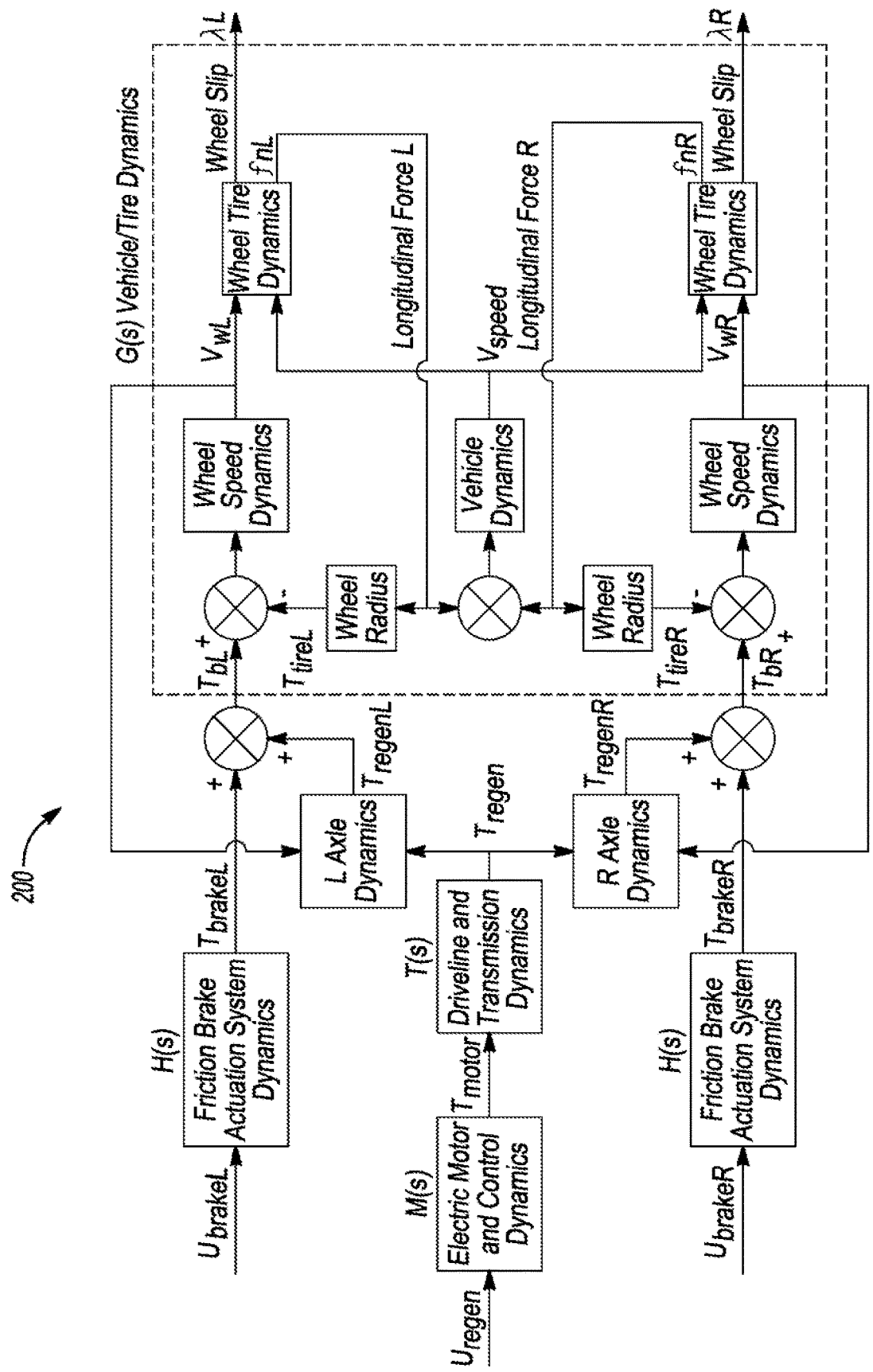
FIG. 3 is a block diagram illustrating a controlled plant for a vehicle braking system.

A schematic block diagram 200 of the controlled plant or system (i.e., HEV 10 in FIG. 1) is illustrated in FIG. 3. The regenerative braking toque $T_{regen}$ is generated by an electric machine (e.g., M/G 18) and is delivered by a driveline having an open differential (e.g., differential 40) and a transmission gearbox (e.g. gearbox 24). The left and right axle shafts (e.g., half shafts 44) between the differential and the wheels (e.g., wheels 42) have different lengths due to the vehicle setup. The open differential and different lengths of the axial drive shafts result in an asymmetry in torque delivery to each wheel. This characteristic is represented by the output torque $T_{regenL}$ and $T_{regenR}$ which are generated by a common regen braking toque $T_{regen}$. The friction brake toque $T_{brake}$ ($T_{brakeL}$ and $T_{brakeR}$) is generated by an electronic or hydraulic based friction brake actuation system.

The regenerative braking torques and the friction brake torques may have negative values during the braking operation. The total braking torques at the left and right wheels, $T_{bL}$ and $T_{bR}$, respectively, is generated by summing the friction brake torque and regenerative brake torque at each wheel (i.e., by summing $T_{brakeL}$ and $T_{regenL}$ and by summing $T_{brakeR}$ and $T_{regenR}$). The total braking torques at each wheel, $T_{bL}$ and $T_{bR}$, is delivered to wheel tire and vehicle G(s) as input torques. A fed or current tire torque $T_{tireL}$ and $T_{tireR}$ at each wheel are subtracted from the total braking torques at each wheel, $T_{bL}$ and $T_{bR}$, respectively. As a result, wheel velocity $V_{speed}$ and longitudinal forces of the left and right wheels or tires, $f_{nL}$ and $f_{nR}$, respectively, are generated. The longitudinal forces, $f_{nL}$ and $f_{nR}$, are also fed to form the tire toques of the left and right wheels, $T_{tireL}$ and $T_{tireR}$, respectively. The slip ratio of left and right wheels, $\lambda_L$ and $\lambda_R$, respectively, during the braking operation is defined based on the left and right wheel's angular velocity, $\omega_L$ and $\omega_R$, respectively, and the vehicle velocity $V_c$ ($V_{speed}$ in FIG. 3) and may be represented by equations (1a) and (1b):

$$\lambda_L = \frac{r_L \omega_L - V_c}{r_L \omega_L} \quad (1a)$$

$$\lambda_R = \frac{r_R \omega_R - V_c}{r_R \omega_R} \quad (1b)$$

where $r_L$ and $r_R$ are radii of the left and right wheels, respectively. The velocities of the left and right wheels are expressed as $V_{wL} = r_L \omega_L$ and $V_{wR} = r_R \omega_R$, respectively. It is noted that the velocity of each wheel, $V_{wL}$ and $V_{wR}$, are fed to each wheel's axles as an expression of the effect from vehicle to driveline. The vehicle and tire dynamics G(s)

shown in FIG. 3 is a nonlinear and unstable in the certain braking operation conditions. It is related with the tire road surface friction coefficient, μ. The friction between the tires and road surface determines the maximum acceleration. If total brake torque at either wheel, $T_{bL}$ or $T_{bR}$, exceeds the maximum acceleration, excessive wheel slip occurs and the λ value at either wheel, $\lambda_L$ or $\lambda_R$, moves or ramps toward a −1 value within the control system of FIG. 3, causing the system to become unstable.

Figure 4:
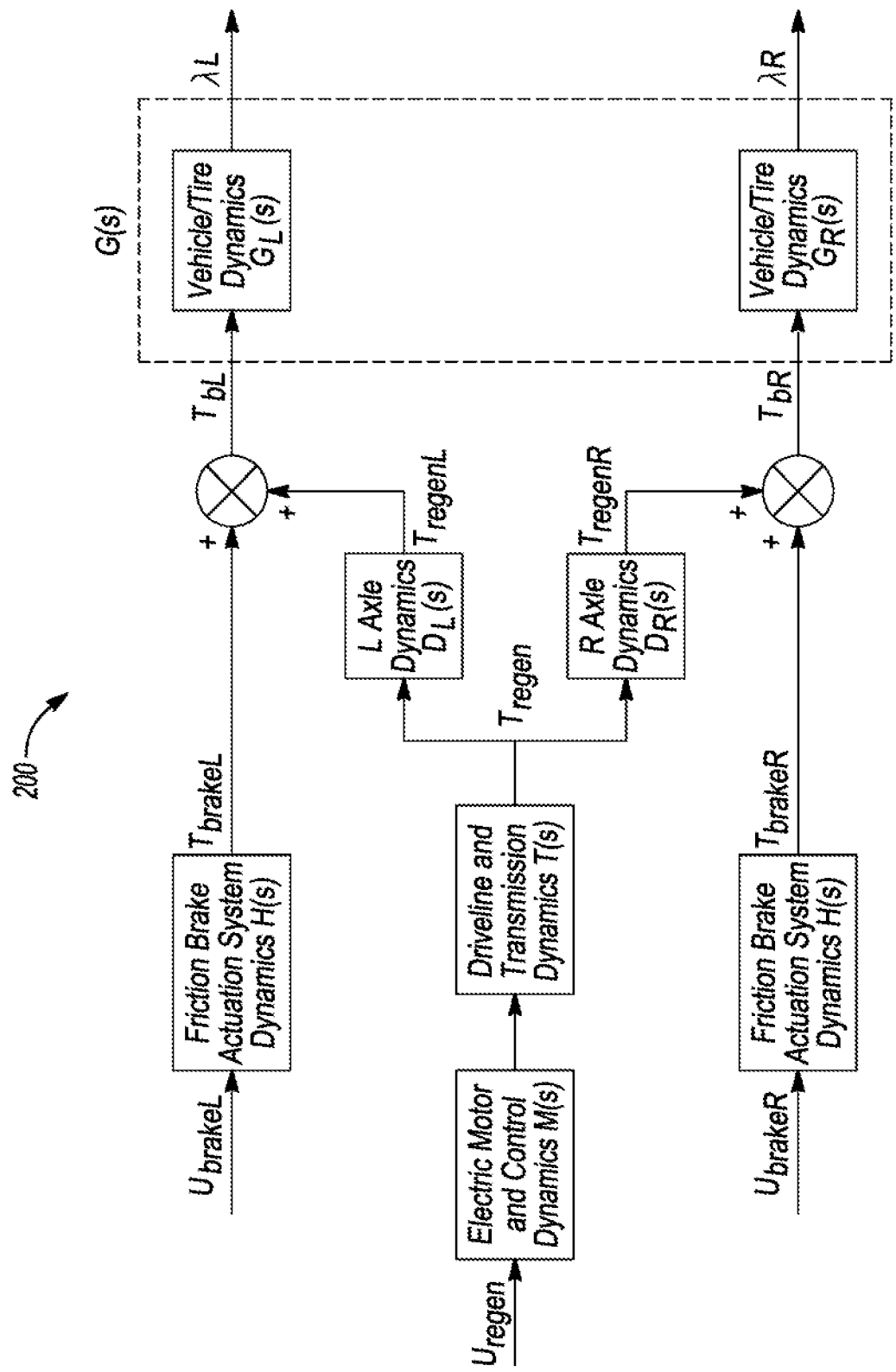
FIG. 4 is a block diagram illustrating a simplified version of the controlled plant in FIG. 3.

The control system shown in FIG. 3 can be simplified as illustrated in FIG. 4. The control system shown in FIG. 4 is described by using the following transfer functions: vehicle and tire dynamics G(s), friction brake actuation system dynamics H(s), electric motor and electric motor controller dynamics M(s), axial driveline and transmission dynamics T(s), left axle or half shaft dynamics $D_L(s)$, and right axle or half shaft dynamics and $D_R(s)$. The driveline and transmission dynamics T(s) represent the dynamics of the gearbox 24, the shaft 36 that connects the gearbox to the differential 40, and any other component that may be between the M/G 18 and the differential 40 (e.g., shaft 30, shaft 32, torque converter 22, etc.). Please note that the configuration may not have a torque converter and the M/G 18 may be connected directly to the input of the gearbox 24. The left axle or half shaft dynamics $D_L(s)$ and the right axle or half shaft dynamics and $D_R(s)$ represent the dynamics of the left and right half shafts 44 that are output of the differential 40. In FIG. 4, the output variables are the wheel slips for each wheel, $\lambda_L$ and $\lambda_R$. The input variables are $u_{brakeL}$ and $u_{brakeR}$ to generate the friction braking torque to the left and right wheels, $T_{brakeL}$ and $T_{brakeR}$, and $u_{regen}$ to generate the regenerative braking torque $T_{regen}$. The regenerative braking torque $T_{regen}$ is divided and delivered to left and right wheels as $T_{regenL}$ and $T_{regenR}$, respectively. The variables $u_{brakeL}$, $u_{brakeR}$, and $u_{regen}$ are representative of signals indicative of friction brake torque demands to the left and right wheels and a regenerative braking torque demand, respectively. More specifically, $u_{regen}$ may be a signal indicative of an electric current required to energize coils of the electric machine (e.g., M/G 18) to produce a desire torque of the electric machine while $u_{brakeL}$ and $u_{brakeR}$ may be signals indicative of a pressures of an actuator (e.g., a master cylinder) required to produce a desire torque of the left and right friction brakes. Alternatively, $u_{brakeL}$ and $u_{brakeR}$ may be a signals indicative of an electric current required to produce a desired torque of friction brakes having and electric actuator, such as a solenoid. Because the tire dynamics of left and right wheels may be different, the vehicle and tire dynamics G(s) are characterized by the vehicle and tire dynamics of the left and right wheels, $G_L(s)$ and $G_R(s)$, in FIG. 4. It is emphasized that the vehicle and tire dynamic G(s) is nonlinear and is also unstable in certain braking operation conditions, in particular, on a low friction, μ, road surface during a large acceleration of the vehicle. We refer such system with dynamics G(s) as being "conditional stable" when properly controlled.

The control system in FIG. 4 operates in an open loop when the wheel slips $\lambda_L$ and $\lambda_R$ are in a stable range and an ABS event has not been activated. When regenerative braking is applied, the total blending braking torque $T_b$ (which represents $T_{bL}$ and $T_{bR}$ collectively) is the sum of friction braking torque $T_{brake}$ (which represents $T_{brakeL}$ and $T_{brakeR}$ collectively) and regenerative braking torque $T_{regen}$ (which represents $T_{regenL}$ plus $T_{regenR}$ collectively). The input control variable $u_{brake}$ (which represents $u_{brakeL}$ and $u_{brakeR}$ collectively) and are determined by using blending control supervisory control logics according to the vehicle operation status and accelerator and brake pedal positions. To prevent excessive wheel slip and maintain vehicle stability, the ABS control is applied to control wheel the left and right wheels slips, $\lambda_L$ and $\lambda_R$, to within a required range. As soon as either the left or right wheels slip, $\lambda_L$ or $\lambda_R$, exceeds the threshold and the ABS is activated, the friction brake input variables $T_{brakeL}$ and $T_{brakeR}$ are taken over by the ABS controller output with a feedback control loop. The wheel slip variables $\lambda_L$ and $\lambda_R$ are fed to form feedback loops and the ABS controllers $C_L(s)$ and $C_R(s)$ adjust the wheel slips $\lambda_L$ and $\lambda_R$ to the desired reference value. This ABS enable and disable process is shown in FIG. 5.

Figure 5:
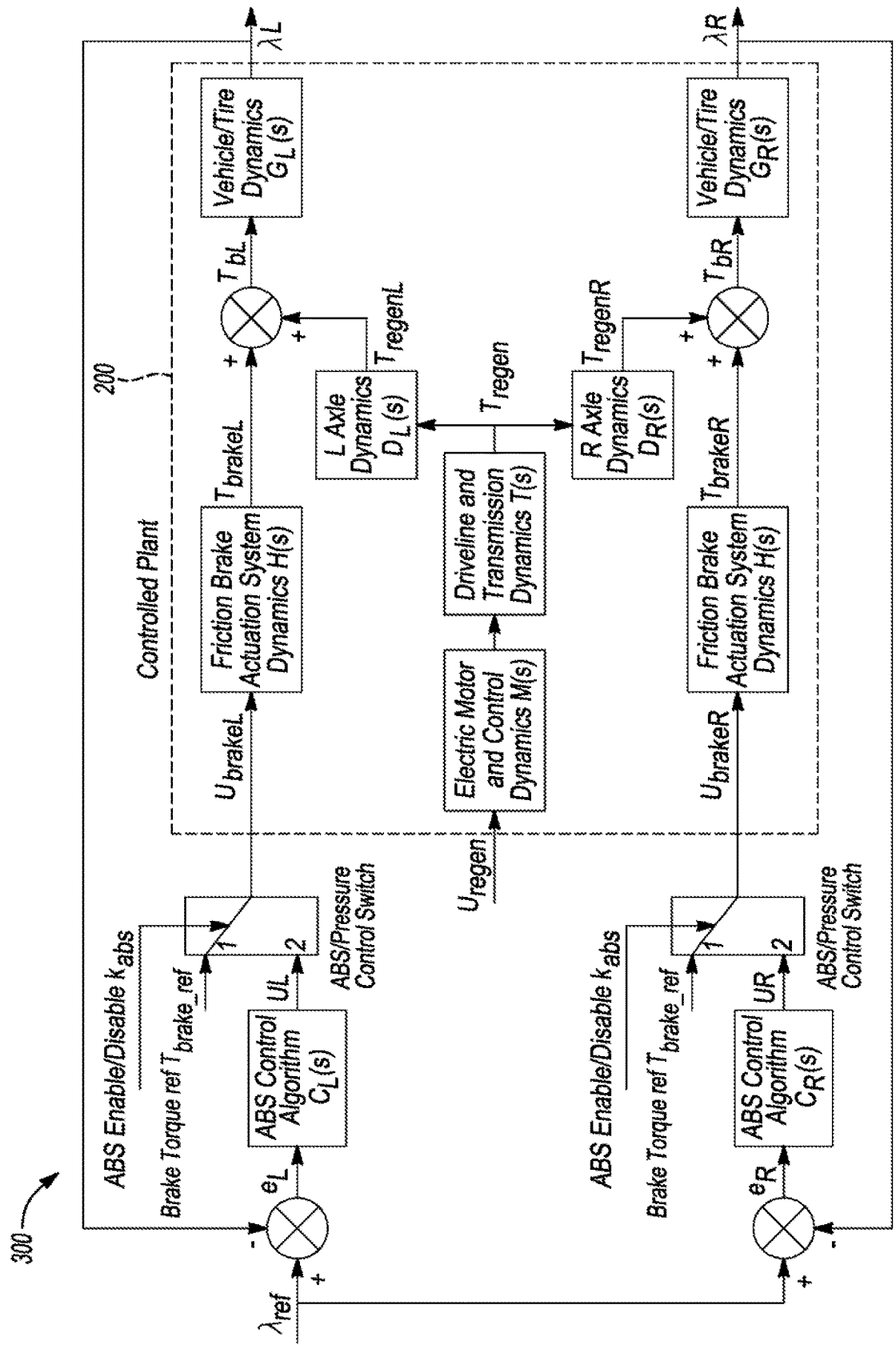
FIG. 5 is a block diagram illustrating a vehicle braking control system, where the control system includes a switching process between enabling and disabling anti-lock braking.

As shown as in the block diagram 300 of FIG. 5, the system operation status (ABS enable or disable) is determined by switch positions, and the switch positions are controlled by signal $k_{abs}$. When the ABS enable/disable switches are in position 1 (Case 1), the control system operates in an open loop, as shown in FIG. 4. When the ABS enable and disable switches are in position 2 (Case 2), the control system operates in a closed loop. Let's analyze the two control systems ABS disable (Case 1) and ABS enable (Case 2) as follows.

Case 1—ABS is Disabled

In case 1, the normal torque blending control is applied according to the control system as shown in FIG. 4. The vehicle and wheels G(s) receive receives two parallel blending torques, $T_{bL}$ in left wheel and $T_{bR}$ in right wheel, which may be represented by equations (2a) and (2b), respectively:

$$T_{bL}(s)=T_{brakeL}(s)+T_{regenL}(s) \tag{2a}$$

$$T_{bR}(s)=T_{brakeR}(s)+T_{regenR}(s) \tag{2b}$$

where $T_{regen}(s)=T_{regenL}+T_{regenR}(s)$.

The transfer function of the total brake torques acting on left and right wheels may be respectively represented by equations (3a) and (3b):

$$T_{bL}(s)=H(s)u_{brakeL}(s)+M(s)T(s)D_L(s)u_{regenL}(s) \tag{3a}$$

$$T_{bR}(s)=H(s)u_{brakeR}(s)+M(s)T(s)D_R(s)u_{regenR}(s) \tag{3b}$$

The open loop transfer functions from the input control variables, $u_{brakeL}$, $u_{brakeR}$, and $u_{regen}$ to the output wheel slip variables, $\lambda_L$ and $\lambda_R$, may be represented by equation (4a) and (4b):

$$\lambda_L(s)=G_L(s)H(s)u_{brakeL}(s)+G_L(s)M(s)T(s)D_L(s)u_{regen}(s) \tag{4a}$$

$$\lambda_R(s)=G_R(s)H(s)u_{brakeR}(s)+G_R(s)M(s)T(s)D_R(s)u_{regen}(s) \tag{4b}$$

It can be observed from equations (4a) and (4b) and from FIG. 4 that wheel slip of each wheel, $\lambda_L$ and $\lambda_R$, is effected by two independent open loop controls. More specifically, the friction brake control inputs, $u_{brakeL}$ and $u_{brakeR}$, generate the friction brake torques, $T_{brakeL}$ and $T_{brakeR}$, independently of the regenerative brake torque $T_{regen}$, and, and the regenerative brake control input $u_{regen}$ generates regenerative brake torque $T_{regen}$ independently of the friction brake torques, $T_{brakeL}$ and $T_{brakeR}$.

Case 2—ABS is Enabled

Figure 6:
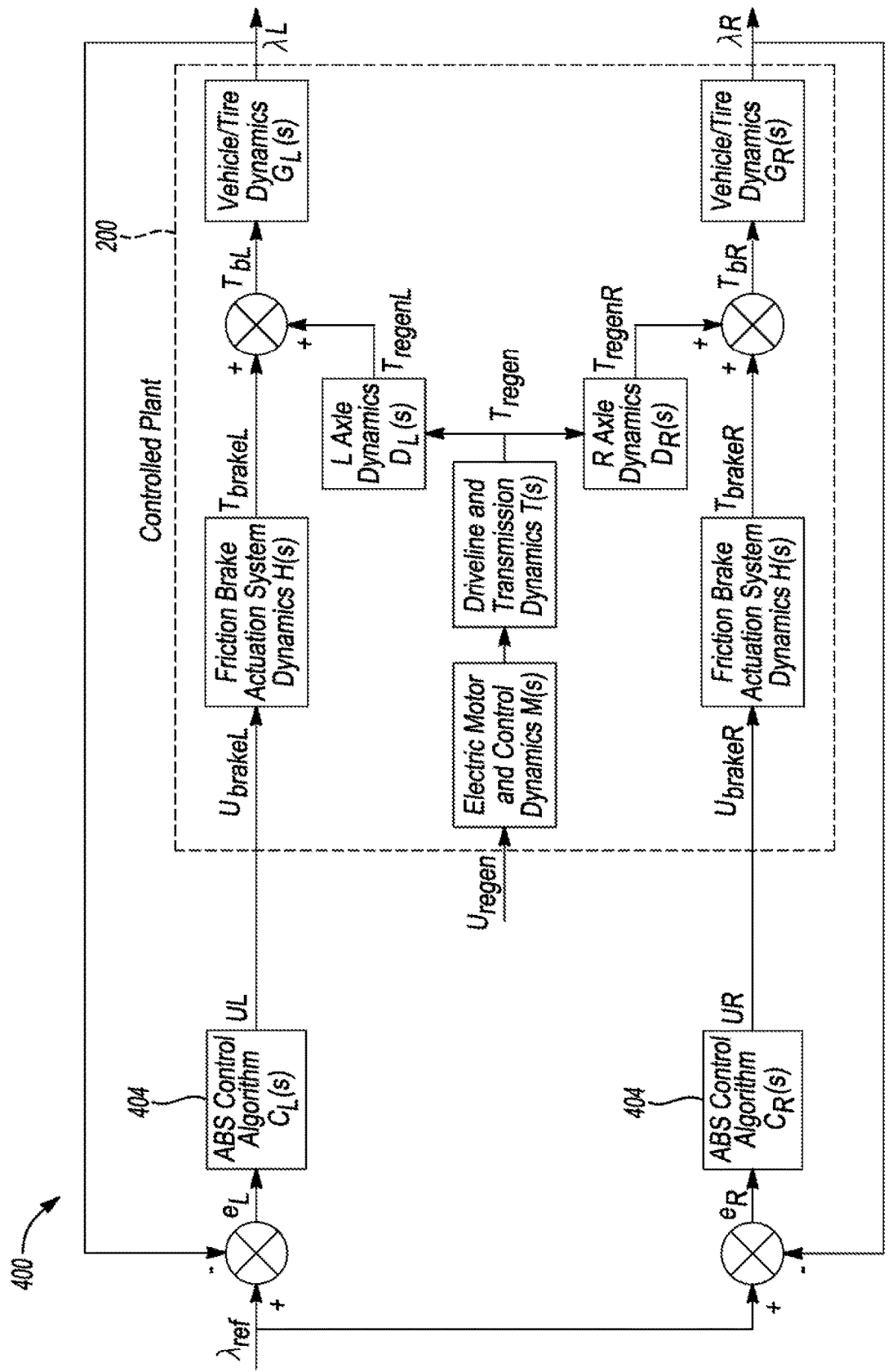
FIG. 6 is a block diagram illustrating the control system of FIG. 5, where the switch is positioned such that the friction brake torques are controlled according to closed loops and such that the regenerative braking torque is controlled according to a feed forward or open loop.

When the ABS is activated, the control system shown in FIG. 5 is re-drawn as block diagram 400 in FIG. 6. The goal of the ABS controller is to control the real wheel slips, $\lambda_L$ and $\lambda_R$, to the desired value $\lambda_{ref}$ by controlling output variables $u_{brakeL}$ and $u_{brakeR}$ to adjust the friction brake torques $T_{brakeL}$ and $T_{brakeR}$. As a result, the actual or real wheel slips, $\lambda_L$ and $\lambda_R$, are controlled to the level of desired value $\lambda_{ref}$. The ABS control system shown in FIG. 6 has similar functions with other general feedback control systems. For example, the ABS control system shown in FIG. 6 has a capability to reject (attenuate) external disturbances and to overcome the uncertainty of controlled plant 200. It means that any change in an external disturbance can cause $T_{brakeL}$ and/or $T_{brakeR}$ to automatically adjust. In summary, during an ABS event, the regenerative braking torque, $T_{regen}$, acts as an external disturbance for the closed loop ABS system. The closed loop ABS control tends to reject any disturbances, which may include regenerative braking torque. As a result, the performance of ABS may be degraded, and possible excessive wheel slip may result. More specifically, when a non-zero regenerative brake torque $T_{regen}$ is added by controlling its input variable $u_{regen}$ during an ABS event, the ABS controllers 404 for the left and right wheels may automatically control the friction braking torques $T_{brakeL}$ and $T_{brakeR}$ to reject the regenerative brake torque $T_{regen}$. An ABS controller is described in U.S. patent application Ser. No. 16/355,084 filed on Mar. 15, 2019. the disclosure of which is hereby incorporated in its entirety by reference herein.

The closed loop transfer functions of FIG. 6 may be described as equations (5a) and (5b):

$$\lambda_L(s) = \frac{C(s)H(s)G_L(s)}{1+C(s)H(s)G_L(s)}\lambda_{ref}(s) + \frac{M(s)T(s)D_L(s)G_L(s)}{1+C(s)H(s)G_L(s)}u_{regen}(s) \quad (5a)$$

$$\lambda_R(s) = \frac{C(s)H(s)G_R(s)}{1+C(s)H(s)G_R(s)}\lambda_{ref}(s) + \frac{M(s)T(s)D_R(s)G_R(s)}{1+C(s)H(s)G_R(s)}u_{regen}(s) \quad (5b)$$

The first items of equations (5a) and (5b) are the closed loop transfer functions of the ABS control system for the led and right wheels with the wheel slip as an input $\lambda_{ref}$. The second items are the transfer functions from regenerative brake torque open loop control with $u_{regen}$ as an input, which may act as external disturbances for the ABS feedback control loops shown as the first items in equations (5a) and (5b).

When the regenerative brake torque control command $u_{regen}(s)=0$, then the second half of equations (5a) and (5b) are zero and there is no external effect or disturbance on the ABS closed loop control via the regenerative braking. If $u_{regen}(s)\ne 0$, that is, the external regenerative braking torque is changed or maintained at a certain level, the ABS has to use the part of the friction brake torques $T_{brakeL}$ and/or $T_{brakeR}$ to overcome the effect of the external regenerative brake torque $T_{regen}$ during ABS events. Thus, the performance of ABS is degraded and possible wheel slipping may occur.

According to above analysis, the non-zero regenerative braking torque controls described with respect to equation (5a) and (5b) and FIGS. 3-6 may have undesirable result. Even through the regenerative brake torque actuation point (see the sum of $T_{regenL}$ and $T_{brakeL}$ and the sum of $T_{regenR}$ and $T_{brakeR}$ in FIG. 6) cannot be changed due to the physical system configuration, control system design may be used to change the control system architecture from design and analysis point of view and convert the regenerative braking torque to an to an effective control variable in the RBS-ABS event problem. An RBS-ABS event controller design that corrects all of the deficiencies above is described as follows.

The design of an RBS-ABS event controller according to a first architecture (hereinafter architecture I) first includes re-writing equations (4a) and (4b), which is the open loop control system transfer function when ABS is disabled, as follows:

First start with equations (4a) and (4b):

$$\lambda_L(s) = G_L(s)H(s)u_{brakeL}(s) + G_L(s)M(s)T(s)D_L(s)u_{regen}(s) \quad (4a)$$

$$\lambda_R(s) = G_R(s)H(s)u_{brakeR}(s) + G_R(s)M(s)T(s)D_R(s)u_{regen}(s) \quad (4b)$$

Next, the design includes introducing a pre-compensator $C_{pc}(s)$ into the open loop system control equations (4a) and (4b) and defining $u_L$ and $u_R$ which are converted into $u_{regen}$, $u_{brakeL}$, and $u_{brakeL}$ according to equations (6a) and (6b), respectively, or according to equations 7(a) and 7(b), respectively:

$$u_{regen}(s) = C_{pc}(s)\alpha_r u_L(s) \quad (6a)$$

$$u_{brakeL}(s) = \alpha_{bL}u_L(s), \text{ and } u_{brakeR}(s) = u_R(s) - \frac{D_R(s)}{D_L(s)}\alpha_r u_L(s) \quad (6b)$$

$$u_{regen}(s) = C_{pc}(s)\alpha_r u_R(s) \quad (7a)$$

$$u_{brakeL}(s) = u_L(s) - \frac{D_L(s)}{D_R(s)}\alpha_r u_R(s), \text{ and } u_{brakeR}(s) = \alpha_{bR}u_R(s) \quad (7b)$$

where $u_L$ and $u_R$ are two common variables for three variable $u_{brakeL}$, $u_{brakeR}$, and $u_{regen}$, which are the left wheel friction braking torque control input, right wheel friction braking torque control input, and regenerative braking torque control input, respectively. More specifically, $u_L$ and $u_R$ may be representative of a signal that is indicative of a total torque demand to the left and right wheels, respectively, while $u_{brakeL}$, $u_{brakeR}$, and $u_{regen}$ may be representative of signals indicative of a left wheel friction brake torque demand, a left right friction brake torque demand, and a regenerative braking torque demand, respectively. The constants $\alpha_{bL}$, $\alpha_{bR}$ and $\alpha_r$ are defined as weighting coefficients for $u_{brakeL}$, $u_{brakeR}$, and $u_{regen}$, respectively. The weighting coefficients should satisfy the following relationship described in either equation (8a) or equation (8b) in order to maintain the ABS control performance:

$$\alpha_{bL}+\alpha_r=1 \quad (8a)$$

$$\alpha_{bR}+\alpha_r=1 \quad (8b)$$

The regenerative braking torque control input $u_{regen}(s)$ is primarily connected to the left wheel friction braking torque control input $u_L(s)$ when equations (6a) and (6b) are utilized (i.e., when equations (6a) and (6b) are utilized the relationship of (8a) must be satisfied). On the other hand, the regenerative braking torque control input $u_{regen}(s)$ is primarily connected to the right wheel friction braking torque control input $u_R(s)$ when equations (7a) and (7b) are utilized (i.e., when equations (7a) and 76b) are utilized the relationship of (8b) must be satisfied).

A first design of the RBS-ABS event controller according to architecture I includes substituting equations (6a) and (6b) into (4a) and (4b), respectively, which results in equations (9a) and (9b):

$$\lambda_L(s) = G_L(s)H(s)\alpha_{bL}u_L(s) + G_L(s)M(s)T(s)D_L(s)C_{pc}(s)\alpha_r u_L(s) \quad (9a)$$

$$\lambda_R(s) = G_R(s)H(s)\left[u_R(s) - \frac{D_R(s)}{D_L(s)}\alpha_r u_L(s)\right] + G_R(s)M(s)T(s)D_R(s)C_{pc}(s)\alpha_r u_L(s) \quad (9b)$$

If $H(s)=M(s)T(s)D_L(s)C_{pc}(s)$ is satisfied in equations (9a) and (9b), the pre-compensator $C_{pc}(s)$ may be described according to equation (10):

$$C_{pc}(s) = \frac{H(s)}{M(s)T(s)D_L(s)} \tag{10}$$

Next, the pre-compensator $C_{pc}(s)$ may be incorporated into the transfer functions of equations (9a) and (9b), which then may be re-written as equations (11a) and (11b):

$$\lambda_L(s) = G_L(s)H(s)\alpha_{bL}u_L(s) + G_L(s)H(s)\alpha_r u_L(s) \tag{11a}$$

$$\lambda_R(s) = G_R(s)H(s)u_R(s) - \tag{11b}$$
$$G_R(s)H(s)\frac{D_R(s)}{D_L(s)}\alpha_r u_L(s) + G_R(s)H(s)\frac{D_R(s)}{D_L(s)}\alpha_r u_L(s)$$

In terms satisfying the relationship described in equation (8a), the transfer functions (11a) and (11b) may be re-written as equations (12a) and (12b), respectively:

$$\lambda_L(s)=(\alpha_{bL}+\alpha_r)G_L(s)H(s)u_L(s)=G_L(s)H(s)u_L(s) \tag{12a}$$

$$\lambda_R(s)=G_R(s)H(s)u_R(s) \tag{12b}$$

Comparing equations (12a) and (12b) to (4a) and (4b), the two friction braking torque control input variables, $u_{brakeL}$ and $u_{brakeR}$, and the single regenerative braking torque control input variable $u_{regen}$ have been integrated into two input variables $u_L$ and $u_R$ by utilizing the variable conversions defined in equations (6a) and (6b). This may be referred to as a 3-2 variable conversion.

The closed loop transfer functions for the controlled system described by equations (12a) and (12b), when including one reference input variable $\lambda_{ref}(s)$, two wheel output variables $\lambda_L(s)$ and $\lambda_R(s)$, and when incorporating the ABS controllers, $C_L(s)$ and $C_R(s)$, may be given as equations (13a) and (13b):

$$\lambda_L(s) = \frac{C_L(s)H(s)G_L(s)}{1+C_L(s)H(s)G_L(s)}\lambda_{ref}(s) \tag{13a}$$

$$\lambda_R(s) = \frac{C_R(s)H(s)G_R(s)}{1+C_R(s)H(s)G_R(s)}\lambda_{ref}(s) \tag{13b}$$

Comparing the closed loop RBS-ABS event control system transfer functions (13a) and (13b) to the original closed-loop based RBS-ABS event control system expressed by equations (5a) and (5b), the effect of the regenerative braking torque is converted from a disturbance variable to a control variable by applying variable conversion (6a) and (6b) in the RBS-ABS event control system.

Figure 7:
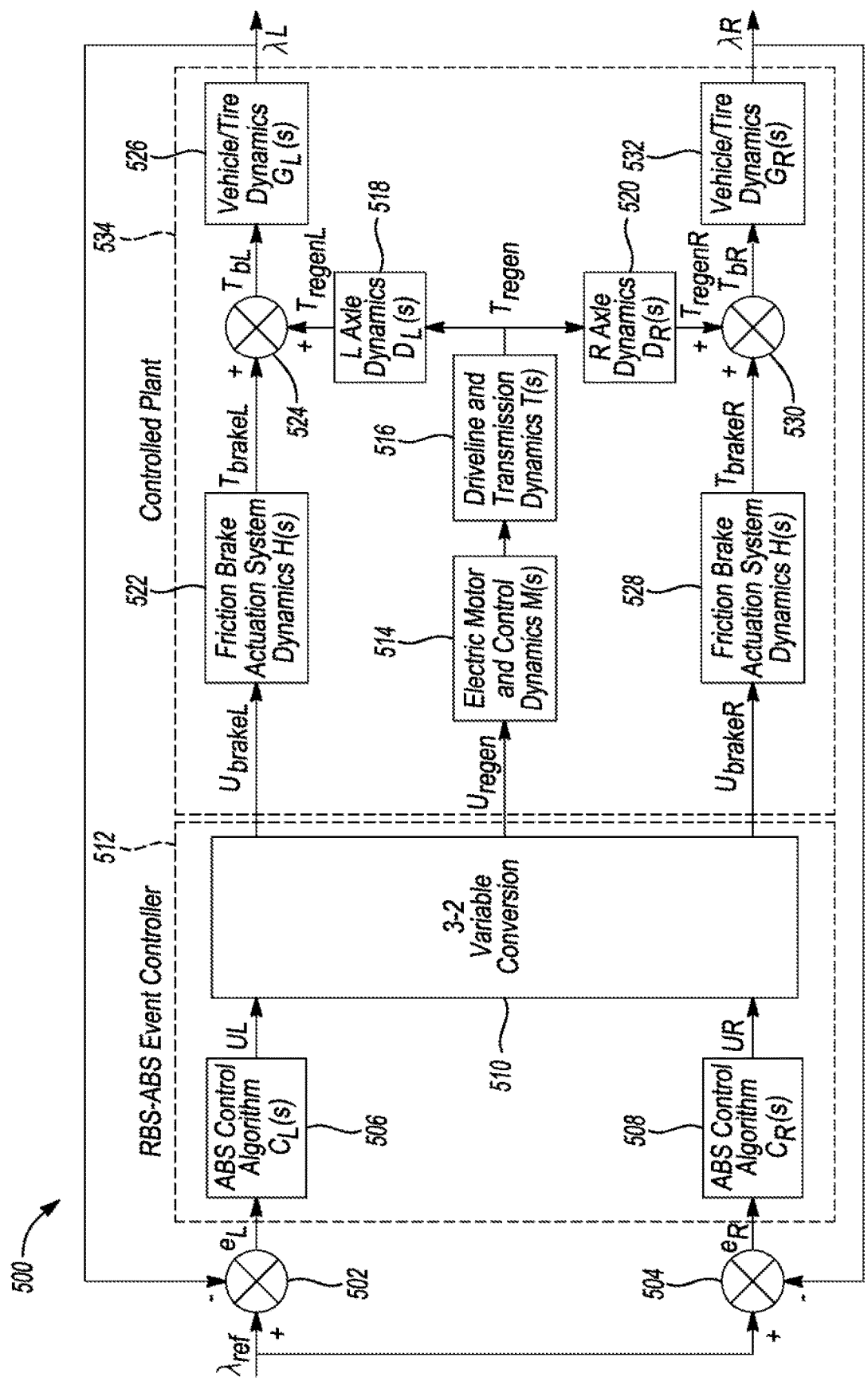
FIG. 7 is a block diagram illustrating a vehicle braking control system where the regenerative braking torque, friction brake torque left wheel, and the friction brake torque of the right wheel are controlled according to closed loops and a 3-2 variable conversion.
Figure 8:
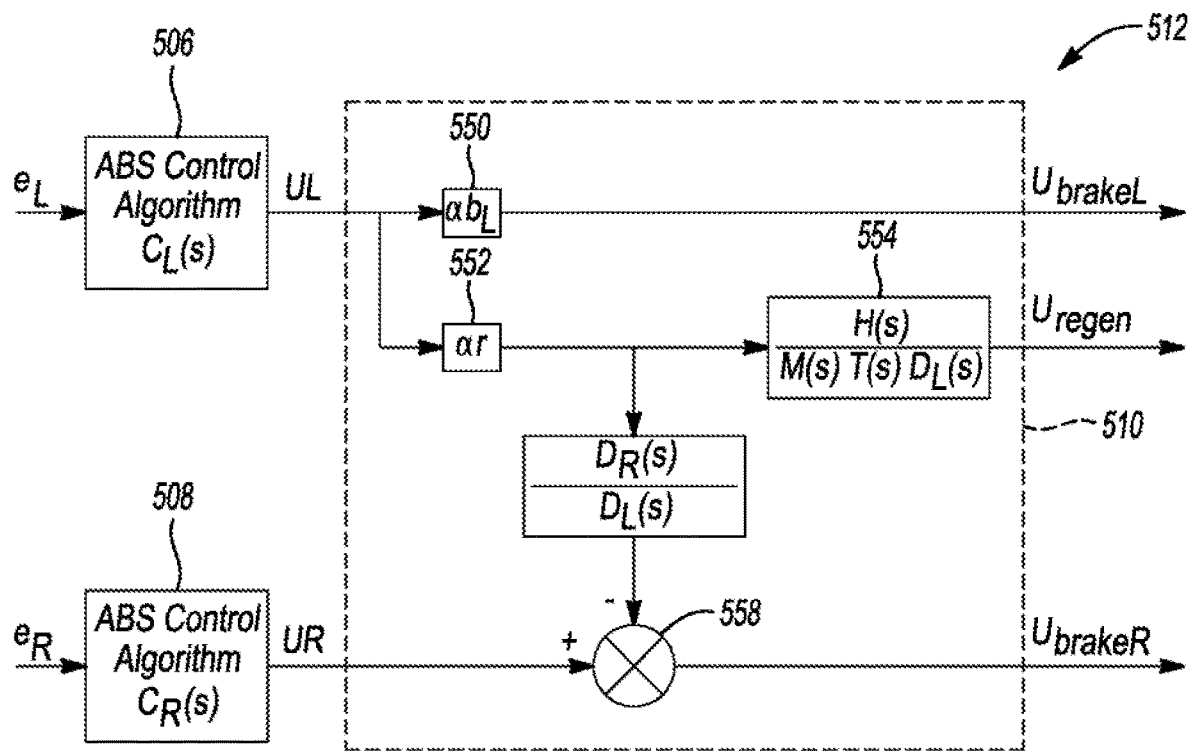
FIG. 8 is a first embodiment of the RBS-ABS event controller depicted in FIG. 7.

FIG. 7 illustrates the closed loop block diagram of the RBS-ABS event control system. The 3-2 conversion in FIG. 7 may be expressed according to equations (6a) and (6b), a first embodiment of which is illustrated in FIG. 8. Alternative embodiments of the 3-2 conversion are described in further detail below. In FIG. 7, the difference $e_L$ between the actual wheel slip $\lambda_L$ of the left wheel and the desired wheel slip $\lambda_{ref}$ is determined at subtraction block 502. The difference $e_R$ between the actual wheel slip $\lambda_R$ of the right wheel and the desired wheel slip $\lambda_{ref}$ is determined at subtraction block 504. The difference $e_L$ is input into the left wheel ABS controller $C_L(s)$ at block 506. The left wheel ABS controller then outputs $u_L$, which may be representative of a signal that is indicative of a left wheel total torque demand. The difference $e_R$ is input into the right wheel ABS controller $C_R(s)$ at block 508. The right wheel ABS controller then outputs $u_R$, which may be representative of a signal that is indicative of a right wheel total torque demand. The signals $u_L$ and $u_R$ are then input into the 3-2 variable conversion block 510. The left wheel ABS controller $C_L(s)$ at block 506, the right wheel ABS controller $C_R(s)$ at block 508, and the 3-2 variable conversion block 510 form the RBS-ABS event controller 512. The 3-2 variable conversion block 510 outputs the $u_{brakeL}$, $u_{brakeR}$, and $u_{regen}$.

The signal $u_{regen}$ is then adjusted according to the electric motor and the electric motor controller dynamics transfer function $M(s)$ at block 514 and the axial driveline and transmission dynamics transfer function $T(s)$ at block 516 to produce the regenerative braking toque $T_{regen}$. The regenerative braking toque $T_{regen}$ is then delivered by the dynamic transfer function of the left half shaft $D_L(s)$ and the dynamic transfer function of the right half shaft $D_R(s)$ at block 518 and 520 to produce the fraction of the regenerative braking torque that is distributed to the left wheel, $T_{regenL}$, and the fraction of the regenerative braking torque that is distributed to the right wheel, $T_{regenR}$, respectively.

The signal $u_{brakeL}$, which is indicative of a left wheel friction braking torque demand, is then adjusted according to the friction brake actuation system dynamics transfer function $H(s)$ at block 522 to produce the left wheel friction braking toque $T_{brakeL}$. The fraction the regenerative braking torque that is distributed lo the left wheel, $T_{regenL}$, and the left wheel friction braking torque $T_{brakeL}$, are then added together at summation block 524 to produce the left wheel total brake torque $T_{bL}$. The left wheel total brake torque $T_{bL}$ is then delivered to the vehicle and left tire dynamics at block 526, which is represented by $G_L(s)$. Block 526 then outputs the actual wheel slip $\lambda_L$ of the left wheel, which is then fed back lo subtraction block 502.

The signal $u_{brakeR}$, which is indicative of a right wheel friction braking torque demand, is then adjusted according to the friction brake actuation system dynamics transfer function $H(s)$ at block 528 to produce the right wheel friction braking toque $T_{brakeR}$. The fraction the regenerative braking torque that is distributed to the right wheel, $T_{regenR}$, and the right wheel friction braking torque $T_{brakeR}$, are then added together at summation block 530 to produce the right wheel total brake torque $T_{bR}$. The right wheel total brake torque $T_{bR}$ is then delivered to the vehicle and right tire dynamics at block 532, which is represented by $G_R(s)$. Block 532 then outputs the actual wheel slip $\lambda_R$ of the right wheel, which is then fed back to subtraction block 504.

The controlled plant 534 illustrated in FIG. 7 includes the electric motor and electric motor controller dynamics $M(s)$, the axial driveline and transmission dynamics $T(s)$, the left half shaft $D_L(s)$ dynamics, the right half shaft $D_R(s)$ dynamics, the friction brake actuation system dynamics transfer function $H(s)$, summation block 524, summation block 530, the vehicle and left tire dynamics $G_L(s)$, and the vehicle and right tire dynamics $G_R(s)$.

FIG. 8 is a block diagram of the first design of the RBS-ABS event controller 512 according to architecture I, which includes a first design of the 3-2 variable conversion block 510. In FIG. 8, the signal $u_L$ is adjusted by the left wheel friction braking weighting coefficient $\alpha_{bL}$ at block 550 to produce the signal $u_{brakeL}$ that is indicative of the left wheel friction braking torque demand. More, specifically, the signal $u_L$ may be multiplied by the left wheel friction braking weighting coefficient $\alpha_{bL}$ at block 550 to produce the signal $u_{brakeL}$ that is indicative of the left wheel friction braking torque demand.

The $u_L$ signal is also adjusted by the regenerative braking weighting coefficient $\alpha_r$ at block 552 and the pre-compensator $C_{pc}(s)$ at block 554 to produce the signal $u_{regen}$ that is indicative of the regenerative braking torque demand. More, specifically, the $u_L$ signal may be multiplied by the regenerative braking weighting coefficient $\alpha_r$ at block 552 and the pre-compensator $C_{pc}(s)$ at block 554 to produce the signal $u_{regen}$ that is indicative of the regenerative braking torque demand.

The signal $u_R$ is sent to subtraction block 558. Then a signal representative of the product of $u_L$, $\alpha_r$, and $$\frac{D_R(s)}{D_L(s)}$$

is then subtracted from $u_r$ at subtraction block 558 to produce the signal $u_{brakeR}$ that is indicative of the right wheel friction braking torque demand.

A second design of an RBS-ABS event controller according to architecture I includes substituting equations (7a) and (7b) into (4a) and (4b), respectively, which results in equations (14a) and (14b):

$$\lambda_L(s) = G_L(s)H(s)\left[u_L(s) - \frac{D_L(s)}{D_R(s)}\alpha_r u_R(s)\right] + \qquad (14a)$$
$$G_L(s)M(s)T(s)D_L(s)C_{pc}(s)\alpha_r u_R(s)$$

$$\lambda_R(s) = G_R(s)H(s)\alpha_{bR}u_R(s) + G_R(s)M(s)T(s)D_R(s)C_{pc}(s)\alpha_r u_R(s) \qquad (14b)$$

If $H(s)=M(s)T(s)D_R(s)C_{pc}(s)$ is satisfied in equations (14a) and (14b), the pre-compensator $C_{pc}(s)$ may be described according to equation (15):

$$C_{pc}(s) = \frac{H(s)}{M(s)T(s)D_R(s)} \qquad (15)$$

Next, the pre-compensator $C_{pc}(s)$ may be incorporated into the transfer functions of equations (14a) and (14b), which then may be re-written as equations (16a) and (16b):

$$\lambda_L(s) = G_L(s)H(s)u_L(s) - \qquad (16a)$$
$$G_L(s)H(s)\frac{D_L(s)}{D_R(s)}\alpha_r u_R(s) + G_L(s)H(s)\frac{D_L(s)}{D_R(s)}\alpha_r u_R(s)$$

$$\lambda_R(s) = G_R(s)H(s)\alpha_{bR}u_R(s) + G_R(s)H(s)\alpha_r u_R(s) \qquad (16b)$$

In terms satisfying the relationship described in equation (8b), the transfer functions (16a) and (16b) may be re-written as equations (17a) and (17b), respectively:

$$\lambda_L(s) = G_L(s)H(s)u_L(s) \qquad (17a)$$

$$\lambda_R(s) = (\alpha_{bR}+\alpha_r)G_R(s)H(s)u_R(s) = G_R(s)H(s)u_R(s) \qquad (17b)$$

Comparing equations (17a) and (17b) to (4a) and (4b), the two friction braking torque control input variables, and $u_{brakeL}$ and $u_{brakeR}$, and the single regenerative braking torque control input variable $u_{regen}$ have been integrated into two input variables $u_L$ and $u_R$ by utilizing the variable conversions defined in equations (7a) and (7b). This may be referred to as a 3-2 variable conversion.

The closed loop transfer functions for the controlled system described by equations (17a) and (17b), when including one reference input variable $\lambda_{ref}(s)$, two wheel output variables $\lambda_L(s)$ and $\lambda_R(s)$, and when incorporating the ABS controllers, $C_L(s)$ and $C_R(s)$, may be given as equations (18a) and (18b):

$$\lambda_L(s) = \frac{C_L(s)H(s)G_L(s)}{1+C_L(s)H(s)G_L(s)}\lambda_{ref}(s) \qquad (18a)$$

$$\lambda_R(s) = \frac{C_R(s)H(s)G_R(s)}{1+C_R(s)H(s)G_R(s)}\lambda_{ref}(s) \qquad (18b)$$

Comparing the closed loop RBS-ABS event control system transfer functions (18a) and (18b) to the original closed-loop based RBS-ABS event control system expressed by equations (5a) and (5b), the effect of the regenerative braking torque is converted from a disturbance variable to a control variable by applying variable conversion (7a) and (7b) in the RBS-ABS event control system.

Figure 9:
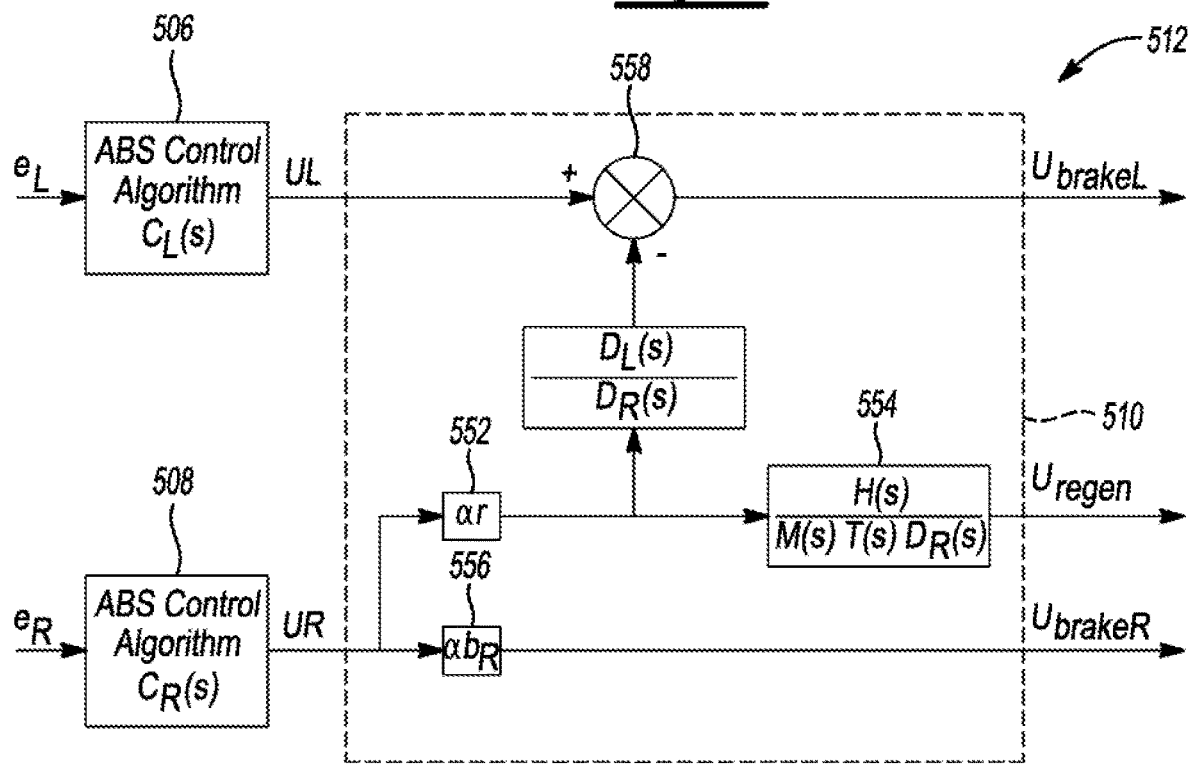
FIG. 9 is a second embodiment of the RBS-ABS event controller depicted in FIG. 7.

FIG. 9 is a block diagram of the second design of the RBS-ABS event controller 512 according to architecture I, which includes an alternative design of the 3-2 variable conversion block 510. In FIG. 9, the signal $u_R$ is adjusted by the right wheel friction braking weighting coefficient $\alpha_{bR}$ at block 556 to produce the signal $u_{brakeR}$ that is indicative of the right wheel friction braking torque demand. More, specifically, the signal $u_R$ may be multiplied by the right wheel friction braking weighting coefficient $\alpha_{bR}$ at block 556 to produce the signal $u_{brakeR}$ that is indicative of the right wheel friction braking torque demand.

The $u_R$ signal is also adjusted by the regenerative braking weighting coefficient $\alpha_r$ at block 552 and the pre-compensator $C_{pc}(s)$ at block 554 to produce the signal $u_{regen}$ that is indicative of the regenerative braking torque demand. More, specifically, the $u_R$ signal may be multiplied by the regenerative braking weighting coefficient $\alpha_r$ at block 552 and the pre-compensator $C_{pc}(s)$ at block 554 to produce the signal $u_{regen}$ that is indicative of the regenerative braking torque demand.

The signal $u_L$ is sent to subtraction block 588. Then a signal representative of the product of $u_R$, $\alpha_r$, and $$\frac{D_L(s)}{D_R(s)}$$

is then subtracted from $u_L$ at subtraction block 558 to produce the signal $u_{brakeL}$ that is indicative of the left wheel friction braking torque demand.

The design of an RBS-ABS event controller according to a second architecture (hereinafter architecture II) first includes re-writing equations (4a) and (4b), which is the open loop control system transfer function when ABS is disabled, as follows:

First start with equations (4a) and (4b):

$$\lambda_L(s) = G_L(s)H(s)u_{brakeL}(s) + G_L(s)M(s)T(s)D_L(s)u_{regen}(s) \qquad (4a)$$

$$\lambda_R(s) = G_R(s)H(s)u_{brakeR}(s) + G_R(s)M(s)T(s)D_R(s)u_{regen}(s) \qquad (4b)$$

Next, the design includes introducing a pre-compensator $C_{pc}(s)$ into the regenerative brake control equations (4a) and (4b) and defining $u_R$ and $u_L$ to be converted into $u_{regen}$, $u_{brakeL}$, and $u_{brakeL}$ according to equations (19a) and (19b), respectively, or according to equations 20(a) and 20(b), respectively, or according to equations 21(a) and 21(b), respectively:

$$u_{regen}(s) = \alpha_r u_L(s) \tag{19a}$$

$$u_{brakeL}(s) = C_{pc}(s)\alpha_{bL}u_L(s), \text{ and} \tag{19b}$$
$$u_{brakeR}(s) = C_{pc}(s)\left[u_R(s) - \frac{D_R(s)}{D_L(s)}\alpha_r u_L(s)\right]$$

$$u_{regen}(s) = \alpha_r u_R(s) \tag{20a}$$

$$u_{brakeL}(s) = C_{pc}(s)\left[u_L(s) - \frac{D_L(s)}{D_R(s)}\alpha_r u_R(s)\right], \text{ and} \tag{20b}$$
$$u_{brakeR}(s) = C_{pc}(s)\alpha_{bR}u_R(s)$$

$$u_{regen}(s) = \alpha_r u_L(s) + \alpha_r u_R(s) \tag{21a}$$

$$u_{brakeL}(s) = C_{pcL}(s)[\alpha_{bL}u_L(s) - \alpha_r u_R(s)] \text{ and,} \tag{21b}$$
$$u_{brakeR}(s) = C_{pcR}(s)[\alpha_{bR}u_R(s) - \alpha_r u_L(s)]$$

where $u_L$ and $u_R$ are two common variables for three variable $u_{brakeL}$, $u_{brakeR}$, and $u_{regen}$, which are the left wheel friction braking torque control input, right wheel friction braking torque control input, and regenerative braking torque control input, respectively. More specifically, $u_L$ and $u_R$ may be representative of a signal that is indicative of a total torque demand to the left and right wheels, respectively, while $u_{brakeL}$, $u_{brakeR}$, and $u_{regen}$ may be representative of signals indicative of a left wheel friction brake torque demand, a left right friction brake torque demand, and a regenerative braking torque demand, respectively. The constants $\alpha_{bL}$, $\alpha_{bR}$ and $\alpha_r$ are defined as weighting coefficients for $u_{brakeL}$, $u_{brakeR}$, and $u_{regen}$, respectively. The weighting coefficients should satisfy the following relationship described in either equation (8a) or equation (8b) in order to maintain the ABS control performance.

A first design of the RBS-ABS event controller according to architecture II includes substituting equations (19a) and (19b) into (4a) and (4b), respectively, which results in equations (22a) and (22b):

$$\lambda_L(s) = G_L(s)H(s)C_{pc}(s)\alpha_{bL}u_L(s) + G_L(s)M(s)T(s)D_L(s)\alpha_r u_L(s) \tag{22a}$$

$$\lambda_R(s) = G_R(s)H(s)C_{pc}(s)\left[u_R(s) - \frac{D_R(s)}{D_L(s)}\alpha_r u_L(s)\right] + \tag{22b}$$
$$G_R(s)M(s)T(s)D_R(s)\alpha_r u_L(s)$$

If $H(s)C_{pc}(s) = M(s)T(s)D_L(s)$ is satisfied in equations (22a) and (22b), the pre-compensator $C_{pc}(s)$ may be described according to equation (23):

$$C_{pc}(s) = \frac{M(s)T(s)D_L(s)}{H(s)} \tag{23}$$

Next, the pre-compensator $C_{pc}(s)$ may be incorporated into the transfer functions of equations (22a) and (22b), which then may be re-written as equations (24a) and (24b):

$$\lambda_L(s) = (\alpha_{bL} + \alpha_r)G_L(s)M(s)T(s)D_L(s)u_L(s) = G_L(s)$$
$$M(s)T(s)D_L(s)u_L(s) \tag{24a}$$

$$\lambda_R(s) = G_R(s)M(s)T(s)D_L(s)u_R(s) \tag{24b}$$

Comparing equations (24a) and (24b) to (4a) and (4b), the two friction braking torque control input variables, $u_{brakeL}$ and $u_{brakeR}$, and the single regenerative braking torque control input variable $u_{regen}$ have been integrated into two input variables $u_L$ and $u_R$ by utilizing the variable conversions defined in equations (19a) and (19b). This may be referred to as a 3-2 variable conversion.

The closed loop transfer functions for the controlled system described by equations (24a) and (24b), when including one reference input variable $\lambda_{ref}(s)$, two wheel output variables $\lambda_L(s)$ and $\lambda_R(s)$, and when incorporating the ABS controllers, $C_L(s)$ and $C_R(s)$, may be given as equations (25a) and (25b):

$$\lambda_L(s) = \frac{C_L(s)G_L(s)M(s)T(s)D_L(s)}{1 + C_L(s)G_L(s)M(s)T(s)D_L(s)}\lambda_{ref}(s) \tag{25a}$$

$$\lambda_R(s) = \frac{C_R(s)G_R(s)M(s)T(s)D_L(s)}{1 + C_R(s)G_R(s)M(s)T(s)D_L(s)}\lambda_{ref}(s) \tag{25b}$$

Figure 10:
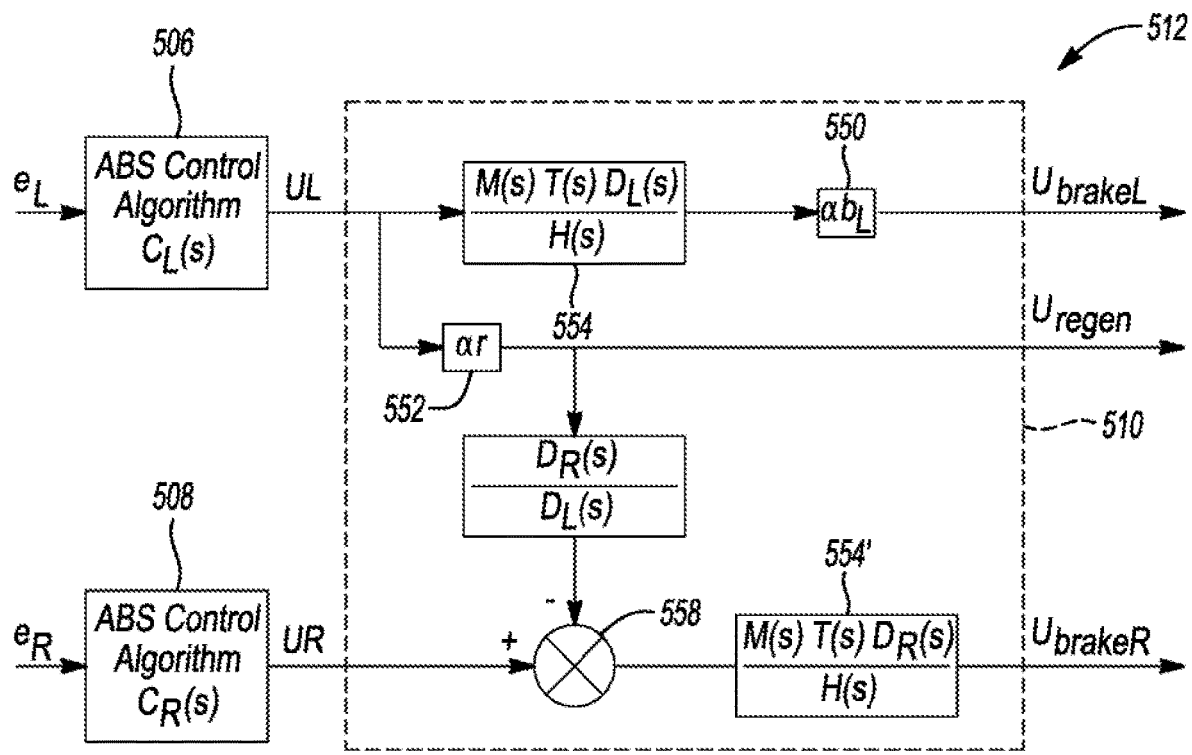
FIG. 10 is a third embodiment of the RBS-ABS event controller depicted in FIG. 7.

FIG. 10 is a block diagram of the first design of the RBS-ABS event controller according to architecture II, which includes an alternative design of the 3-2 variable conversion block 510. In FIG. 10, the signal $u_L$ is adjusted by the pre-compensator $C_{pc}(s)$ at block 554 and the left wheel friction braking weighting coefficient $\alpha_{bL}$ at block 550 to produce the signal $u_{brakeL}$ that is indicative of the left wheel friction braking torque demand. More, specifically, the signal $u_L$ may be multiplied by the pre-compensator $C_{pc}(s)$ at block 554 and the left wheel friction braking weighting coefficient $\alpha_{bL}$ at block 550 to produce the signal $u_{brakeL}$ that is indicative of the left wheel friction braking torque demand.

The $u_L$ signal is also adjusted by the regenerative braking weighting coefficient $\alpha_r$ at block 552 to produce the signal $u_{regen}$ that is indicative of the regenerative braking torque demand. More specifically, the $u_L$ signal may be multiplied by the regenerative braking weighting coefficient $\alpha_r$ at block 552 to produce the signal $u_{regen}$ that is indicative of the regenerative braking torque demand.

The signal $u_R$ is sent to subtraction block 558. Then a signal representative of the product of $u_L$, $\alpha_r$, and $$\frac{D_R(s)}{D_L(s)}$$

is then subtracted from $u_R$ at subtraction block 558. After subtraction block 558, the signal may be further multiplied by a pre-compensator $C_{pc}(s)$ at block 554' to produce the signal $u_{brakeR}$ is indicative of the right wheel friction braking torque demand.

A second design of the RBS-ABS event controller according to architecture II includes substituting equations (20a)

and (20b) into (4a) and (4b), respectively, which results in equations (26a) and (26b):

$$\lambda_L(s) = G_L(s)H(s)C_{pc}(s)\left[u_L(s) - \frac{D_L(s)}{D_R(s)}\alpha_r u_R(s)\right] + \quad (26a)$$
$$G_L(s)M(s)T(s)D_L(s)\alpha_r u_R(s)$$

$$\lambda_R(s) = G_R(s)H(s)C_{pc}(s)\alpha_{bR}u_R(s) + G_R(s)M(s)T(s)D_R(s)\alpha_r u_R(s) \quad (26b)$$

If $H(s)C_{pc}(s)=M(s)T(s)D_R(s)$ is satisfied in equations (26a) and (26b), the pre-compensator $C_{pc}(s)$ may be described according to equation (26c):

$$C_{pc}(s) = \frac{M(s)T(s)D_R(s)}{H(s)} \quad (26c)$$

Next the pre-compensator $C_{pc}(s)$ may be incorporated into the transfer functions of equations (26a) and (26b), which then may be re-written as equations (27a) and (27b):

$$\lambda_L(s)=G_L(s))M(s)T(s)D_R(s)u_L(s) \quad (27a)$$

$$\lambda_R(s)=(\alpha_{bL}+\alpha_r)G_R(s)M(s)T(s)D_R(s)u_R(s)=G_R(s)M(s)T(s)D_R(s)u_R(s) \quad (27b)$$

Comparing equations (27a) and (27b) to (4a) and (4b), the two friction braking torque control input variables, $u_{brakeL}$ and $u_{brakeR}$, and the single regenerative braking torque control input variable $u_{regen}$ have been integrated into two input variables $u_L$ and $u_R$ by utilizing the variable conversions defined in equations (20a) and (20b). This may be referred to as a 3-2 variable conversion.

The closed loop transfer functions for the controlled system described by equations (27a) and (27b), when including one reference input variable $\lambda_{ref}(s)$, two wheel output variables $\lambda_L(s)$ and $\lambda_R(s)$, and when incorporating the ABS controllers, $C_L(s)$ and $C_R(s)$, may be given as equations (28a) and (28b):

$$\lambda_L(s) = \frac{C_L(s)G_L(s)M(s)T(s)D_R(s)}{1+C_L(s)G_L(s)M(s)T(s)D_R(s)}\lambda_{ref}(s) \quad (28a)$$

$$\lambda_R(s) = \frac{C_R(s)G_R(s)M(s)T(s)D_R(s)}{1+C_R(s)G_R(s)M(s)T(s)D_R(s)}\lambda_{ref}(s) \quad (28b)$$

Figure 11:
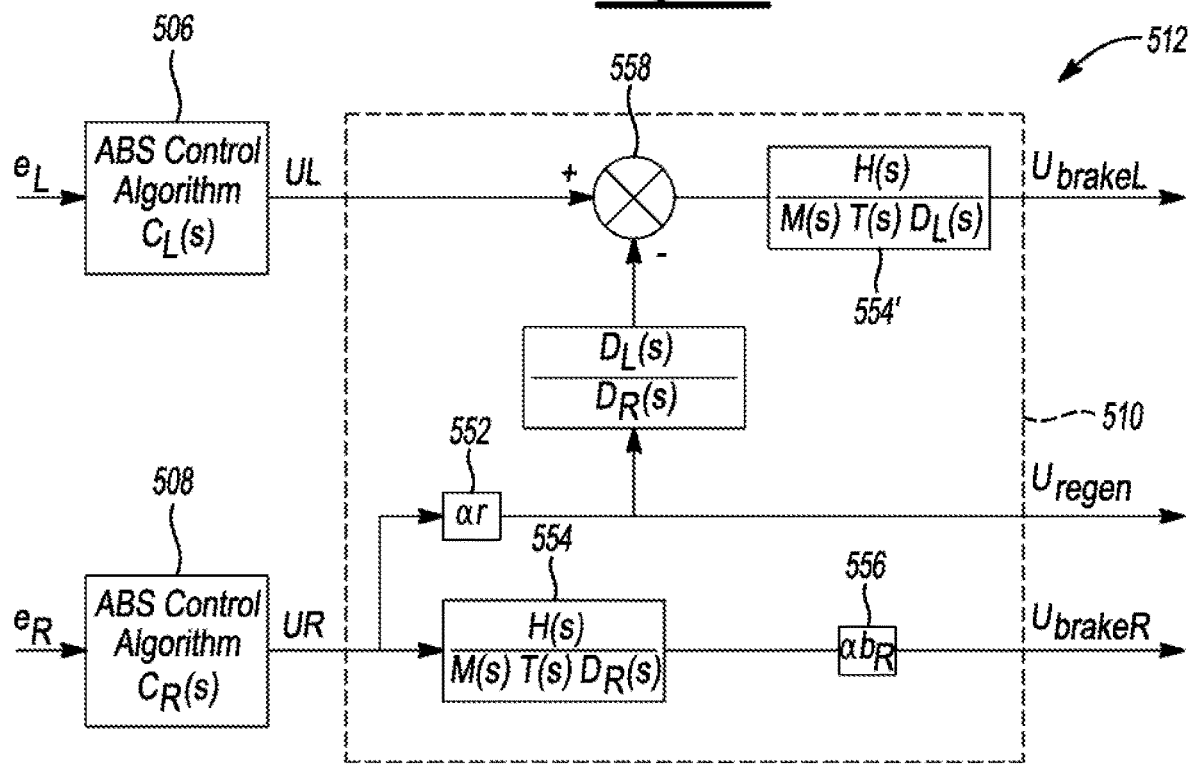
FIG. 11 is a fourth embodiment of the RBS-ABS event controller depicted in FIG. 7.

FIG. 11 is a block diagram of the second design of the RBS-ABS event controller according to architecture II, which includes an alternative design of the 3-2 variable conversion block 510. In FIG. 11, the signal $u_R$ is adjusted by the pre-compensator $C_{pc}(s)$ at block 554 and the right wheel friction braking weighting coefficient $\alpha_{bR}$ at block 556 to produce the signal $u_{brakeR}$ that is indicative of the right wheel friction braking torque demand. More, specifically, the signal $u_R$ may be multiplied by the pre-compensator $C_{pc}(s)$ at block 554 and the right wheel friction braking weighting coefficient $\alpha_{bR}$ at block 556 to produce the signal $u_{brakeR}$ that is indicative of the right wheel friction braking torque demand.

The $u_R$ signal is also adjusted by the regenerative braking weighting coefficient $\alpha_r$ at block 552 to produce the signal $u_{regen}$ that is indicative of the regenerative braking torque demand. More, specifically, the $u_R$ signal may be multiplied by the regenerative braking weighting coefficient $\alpha_r$ at block 552 to produce the signal $u_{regen}$ that is indicative of the regenerative braking torque demand.

The signal $u_L$ is sent to subtraction block 558. Then a signal representative of the product of $u_R$, $\alpha_r$, and $$\frac{D_L(s)}{D_R(s)}$$

is then subtracted from $u_L$ at subtraction block 558. After subtraction block 558, the signal may be further multiplied by a pre-compensator $C_{pc}(s)$ at block 554' to produce the signal $u_{brakeL}$ that is indicative of the left wheel friction braking torque demand.

A third design of the RBS-ABS event controller according to architecture II includes substituting equations (21a) and (21b) into (4a) and (4b), respectively, which results in equations (29a) and (29b):

$$\lambda_L(s)=G_L(s)H(s)C_{pcL}(s)(\alpha_{bL}u_L(s)-\alpha_r u_R(s))+G_L(s)M(s)T(s)D_L(s)(\alpha_r u_L(s)+\alpha_r u_R(s)) \quad (29a)$$

$$\lambda_R(s)=G_R(s)H(s)C_{pcR}(s)(\alpha_{bR}u_R(s)-\alpha_r u_L(s))+G_R(s)M(s)T(s)D_R(s)(\alpha_r u_R(s)+\alpha_r u_L(s)) \quad (29b)$$

If $H(s)C_{pcL}(s)=M(s)T(s)D_L(s)$ and $H(s)C_{pcR}(s)=M(s)T(s)D_R(s)$ are satisfied in equations (29a) and (29b), the pre-compensators $C_{pcL}(s)$ and $C_{pcR}(s)$ may be described according to equation (29c):

$$C_{pcL}(s) = \frac{M(s)T(s)D_L(s)}{H(s)}, \text{ and } C_{pcR}(s) = \frac{M(s)T(s)D_R(s)}{H(s)} \quad (29c)$$

Next, the pre-compensators $C_{pcL}(s)$ and $C_{pcR}(s)$ may be incorporated into the transfer functions of equations (29a) and (29b), which then may be re-written as equations (30a) and (30b):

$$\lambda_L(s)=G_L(s)M(s)T(s)D_L(s)u_L(s) \quad (30a)$$

$$\lambda_R(s)=G_R(s)M(s)T(s)D_R(s)u_R(s) \quad (30a)$$

Comparing equations (30a) and (30b) to (4a) and (4b), the two friction braking torque control input variables, $u_{brakeL}$ and $u_{brakeR}$, and the single regenerative braking torque control input variable $u_{regen}$ have been integrated into two input variables $u_L$ and $u_R$ by utilizing the variable conversions defined in equations (21a) and (21b). This may be referred to as a 3-2 variable conversion.

The closed loop transfer functions for the controlled system described by equations (30a) and (30b), when including one reference input variable $\lambda_{ref}(s)$, two wheel output variables $\lambda_L(s)$ and $\lambda_R(s)$, and when incorporating the ABS controllers, $C_L(s)$ and $C_R(s)$, may be given as equations (31a) and (31b):

$$\lambda_L(s) = \frac{C_L(s)M(s)T(s)D_L(s)}{1+C_L(s)M(s)T(s)D_L(s)}\lambda_{ref}(s) \quad (31a)$$

$$\lambda_L(s) = \frac{C_R(s)M(s)T(s)D_R(s)}{1+C_R(s)M(s)T(s)D_R(s)}\lambda_{ref}(s) \quad (31b)$$

Figure 12:
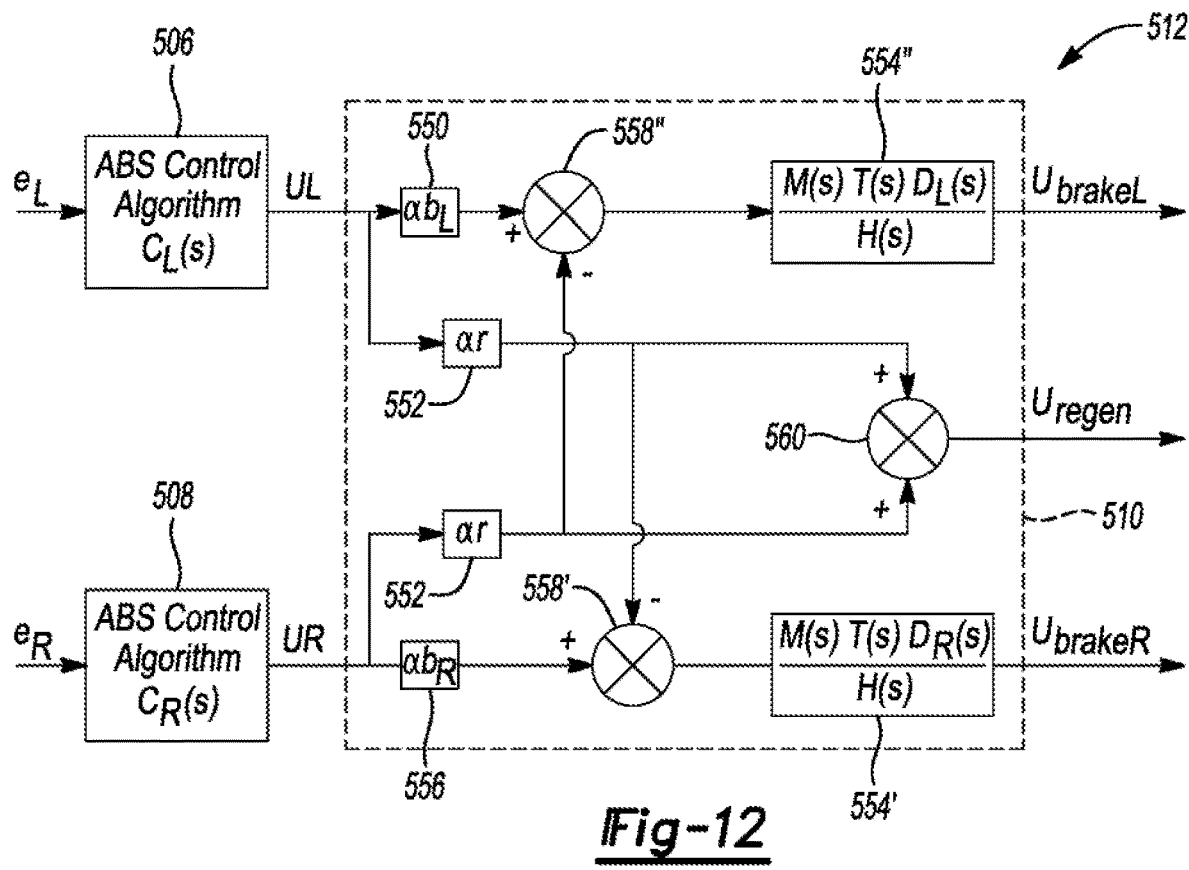
FIG. 12 is a fifth embodiment of the RBS-ABS event controller depicted in FIG. 7.

FIG. 12 is a block diagram of the third design of the RBS-ABS event controller according to architecture II, which includes an alternative design of the 3-2 variable conversion block 510. In FIG. 12, the signal $u_R$ is adjusted by the right wheel friction braking weighting coefficient $\alpha_{bR}$ at block 556. More, specifically, the signal $u_R$ may be multiplied by the right wheel friction braking weighting coefficient $\alpha_{bR}$ at block 556. Then a signal representative of the product of $u_L$ and $\alpha_r$ is then subtracted from the product of $u_R$ and $\alpha_{bR}$ at subtraction block 558'. The output of subtraction block 558' is then multiplied by the pre-compensator $C_{pcR}(s)$ at block 554' to produce the signal $u_{brakeR}$ that is indicative of the right wheel friction braking torque demand.

The signal $u_L$ is adjusted by the left wheel friction braking weighting coefficient $\alpha_{bL}$ at block 550. More, specifically, the signal $u_L$ may be multiplied by the left wheel friction braking weighting coefficient $\alpha_{bL}$ at block 550. Then a signal representative of the product of $u_R$ and $\alpha_r$ is then subtracted from the product of $u_L$ and $\alpha_{bL}$ at subtraction block 558". The output of subtraction block 558" is then multiplied by the pre-compensator $C_{pcL}(s)$ at block 554" to produce the signal $u_{brakeL}$ that is indicative of the left wheel friction braking torque demand.

The $u_R$ signal is also adjusted by the regenerative braking weighting coefficient $\alpha_r$ at block 552. The $u_L$ signal is also adjusted by the regenerative braking weighting coefficient $\alpha_r$ at block 552. The product of $u_R$ and $\alpha_r$ is then added to the product of $u_L$ and $\alpha_r$ at block 560 to produce the signal $u_{regen}$ that is indicative of the regenerative braking torque demand The weighting coefficient $\alpha_r$ defines how much braking torque is delivered by the regenerative braking loop. If $\alpha_r$ is set to zero, no regen braking torque is delivered and the RBS-ABS event control controls friction braking only. If $\alpha_r$ is be set to its maximum value (i.e., $\alpha_r$=1), then the vehicle is free of ABS control. Generally, the friction brakes supply the additional torque in order to meet the driver's deceleration request because the maximum regenerative braking torque level $T_{regen}$ is usually not enough. The principle in determining $\alpha_r$ is to generate the most possible regen braking torque. Two methods may be utilized to determine the optimal $\alpha_r$.

Figure 13:
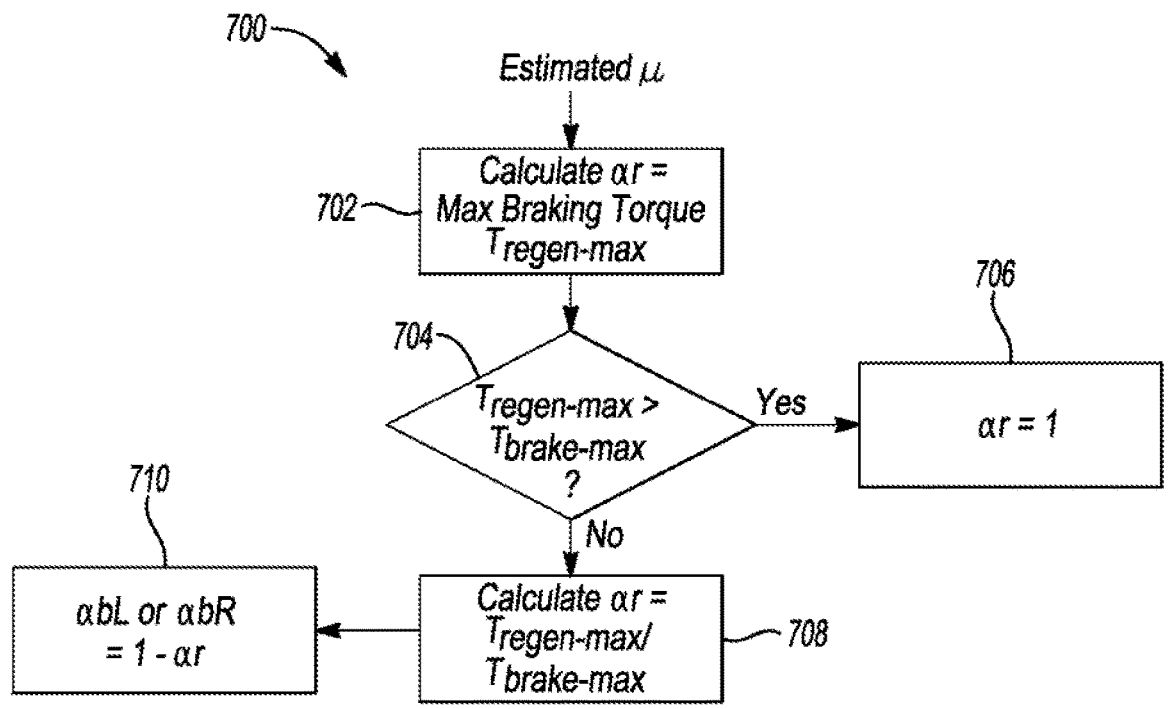
FIG. 13 is a flowchart illustrating a first method of calculating the friction braking and regenerative braking weighting coefficients.

The first method (hereinafter referrer to method 1), which is represented by the flowchart 700 in FIG. 13, includes determining the weighting coefficient $\alpha_r$ according to the real time estimate of the coefficient of friction between the tire and the road surface μ, which is input into block 702. Next, the maximum braking torque possible on any particular axle before wheel lock occurs is determined at block 702 according to $T_{brake-max}=F_{brake-max}R=(M*g*\mu)R$, where R is the tire radius, $F_{brake-max}$ total possible braking maximum force on the axle (Nm), M vehicle axle mass (kg), and g acceleration due to gravity (m/sec$^2$), and μ is the coefficient of friction between the road and tire. If μ can be estimated, the maximum braking torque $T_{brake-max}$ can be obtained. The maximum regenerative braking torque $T_{regen-max}$ of the electric machine or motor (e.g., M/G 18) may be obtained from its torque-speed characteristic curve of the particular electric machine or motor. Based on the maximum braking torque $T_{regen-max}$ and the maximum regenerative braking torque $T_{regen-max}$, the weighting coefficient $\alpha_r$ may be determined according to decision block 704. If $T_{regen-max}>T_{brake-max}$ at block 704 the electric motor (e.g., M/G 18) has the capacity to generate the required maximum braking torque and the method moves on to block 706 where $\alpha_r$=1. If $T_{regen-max}<T_{brake-max}$ at block 704 the electric motor does not have enough capacity generate the required maximum braking torque and the method moves on to blocks 708 and 710 where $\alpha_r=T_{regen-max}/T_{brake-max}$, which is less than 1, and $\alpha_{bL}$ or $\alpha_{bL}$ (depending on which is controlling) is set to $1-\alpha_r$.

Figure 14:
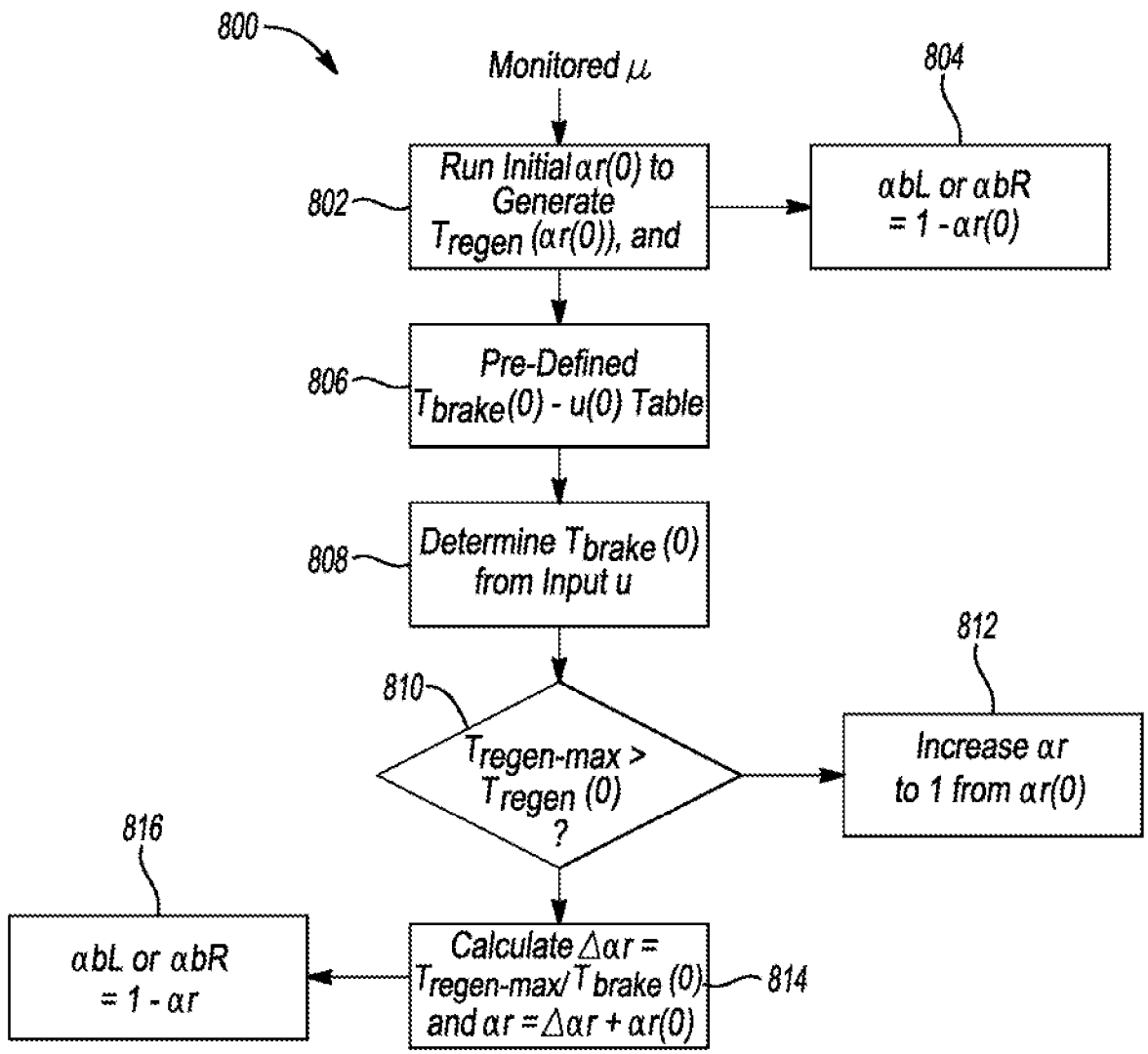
FIG. 14 is a flowchart illustrating a second method of calculating the friction braking and regenerative braking weighting coefficients.
Figure 15A:
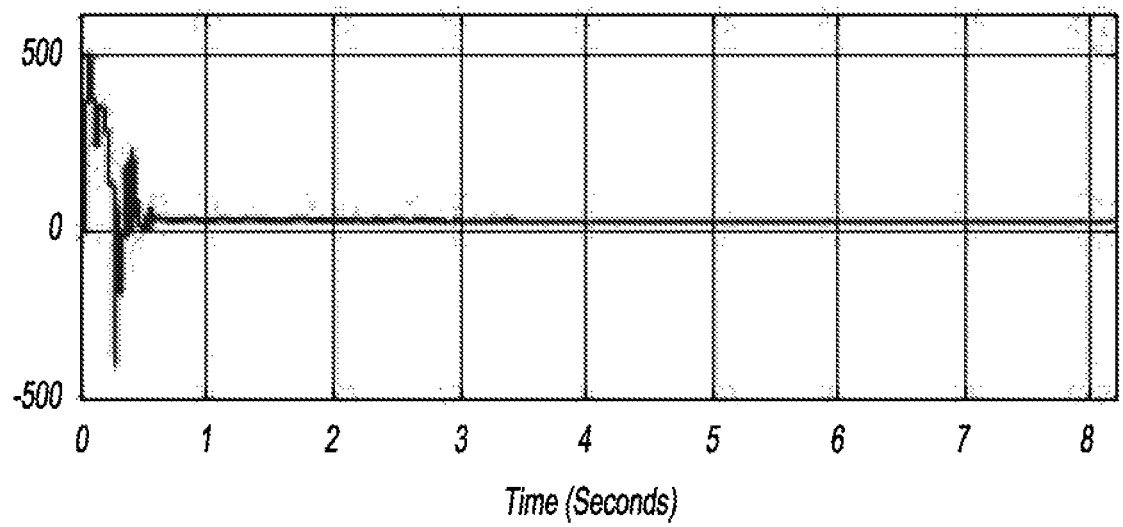
FIGS. 15A-15H are a series of graphs that illustrate braking control results during an anti-lock braking event that included no regenerative braking input.
Figure 15B:
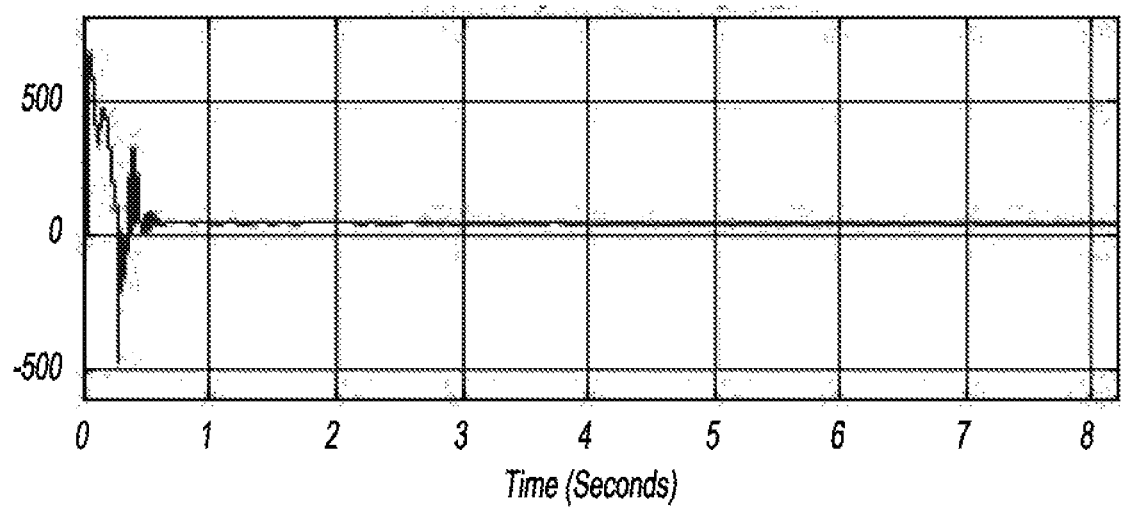
Figure 15C:
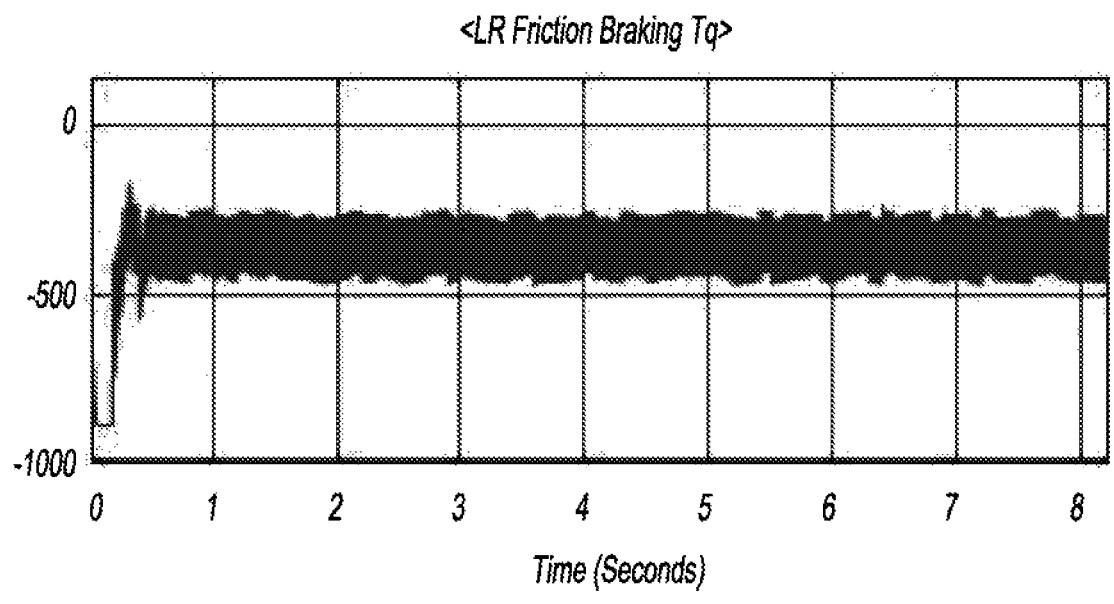
Figure 15D:
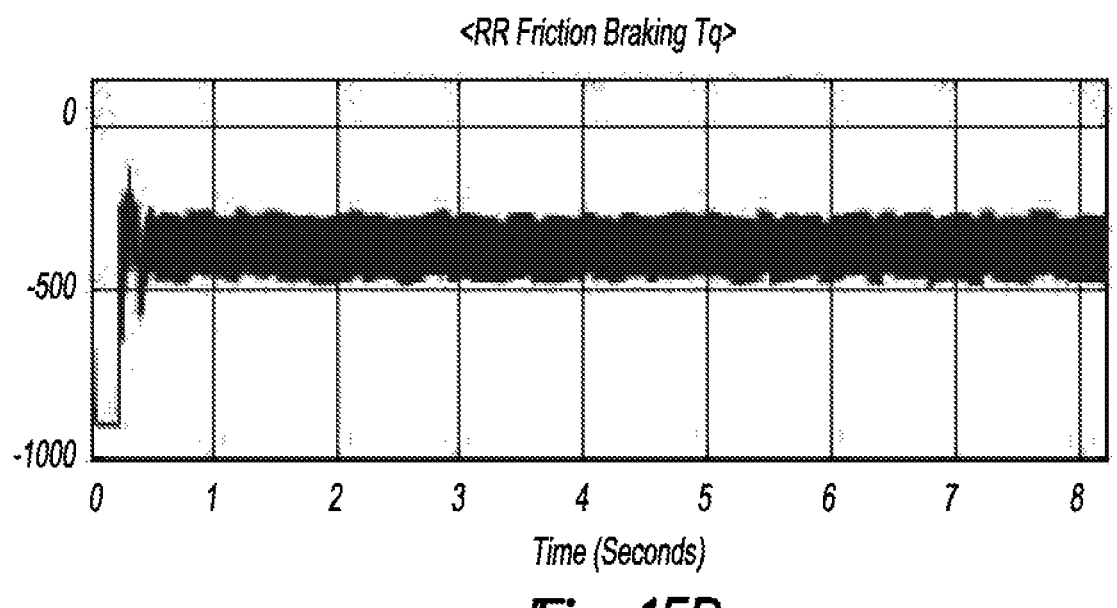
Figure 15E:
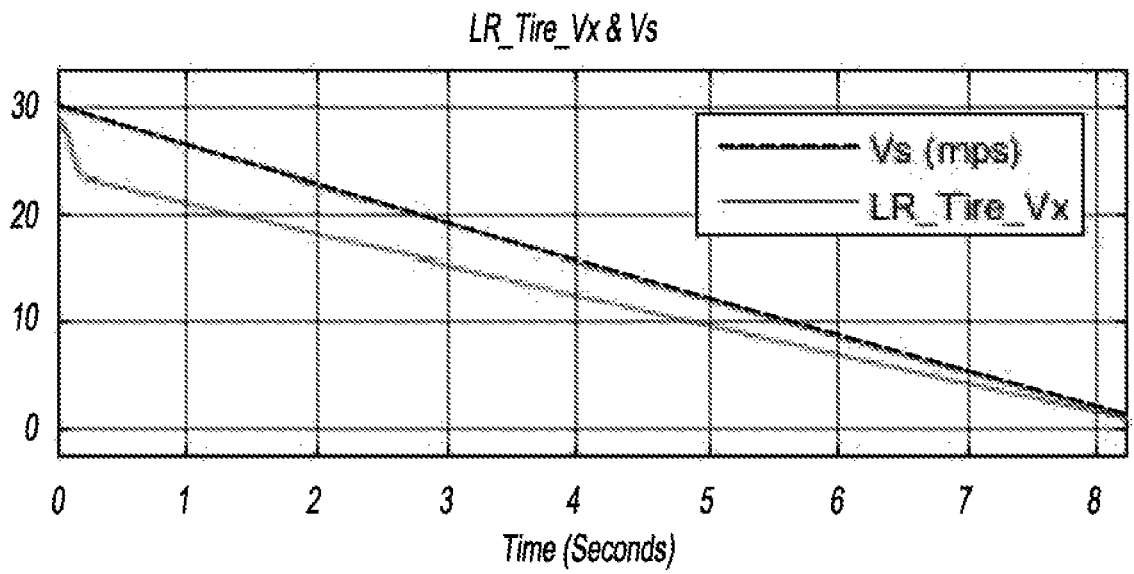
Figure 15F:
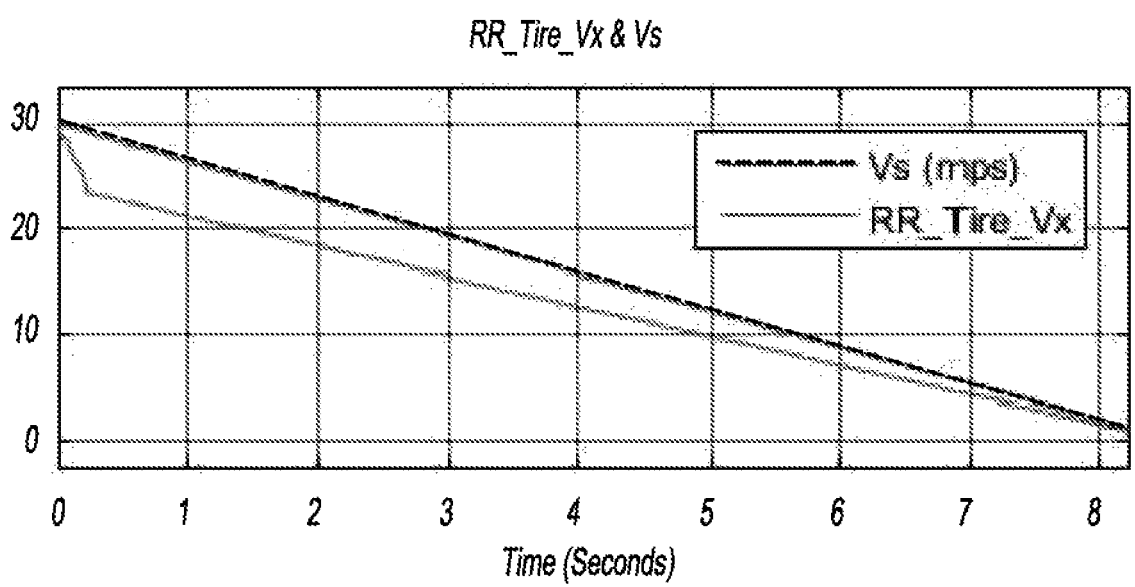
Figure 15G:
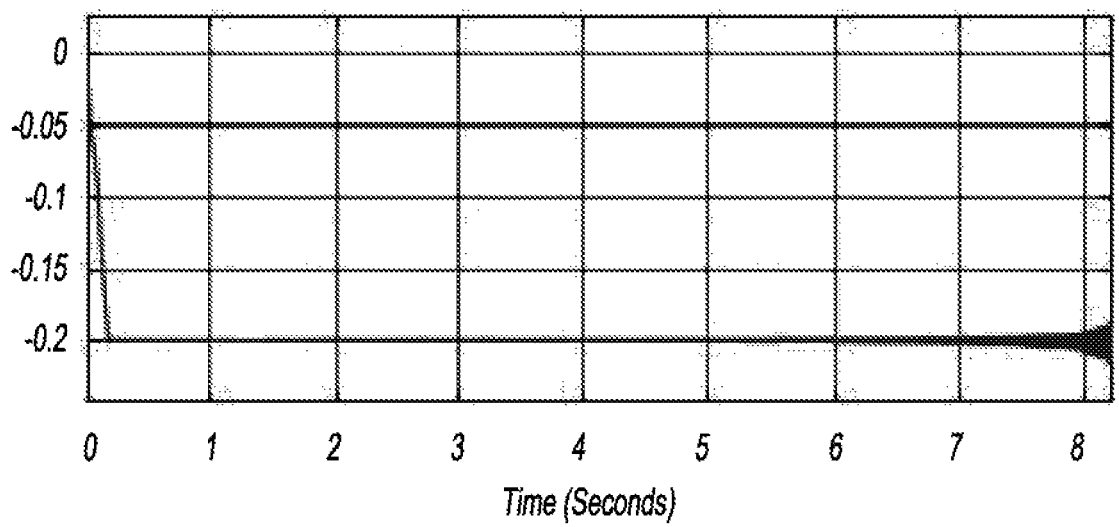
Figure 15H:
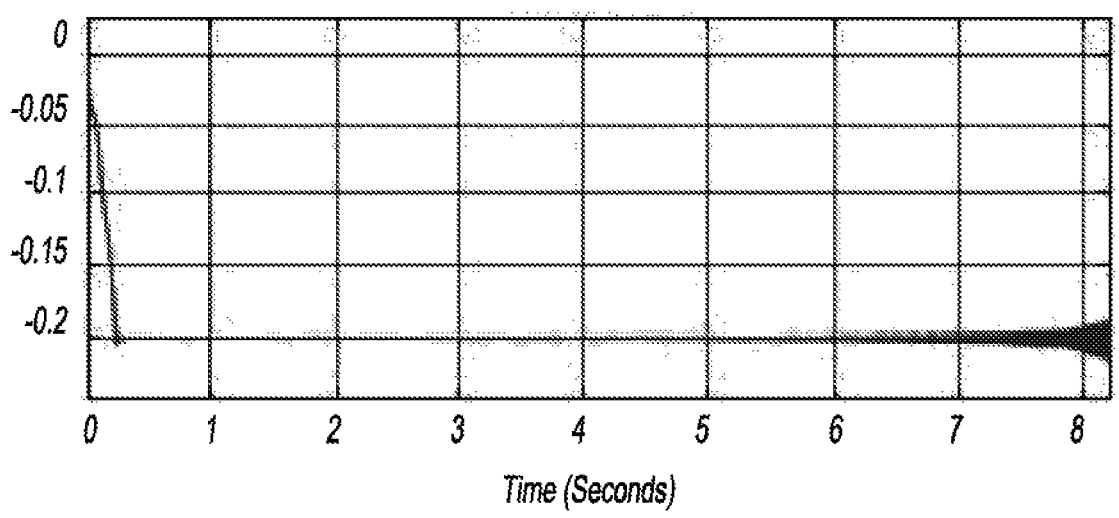
Figure 16A:
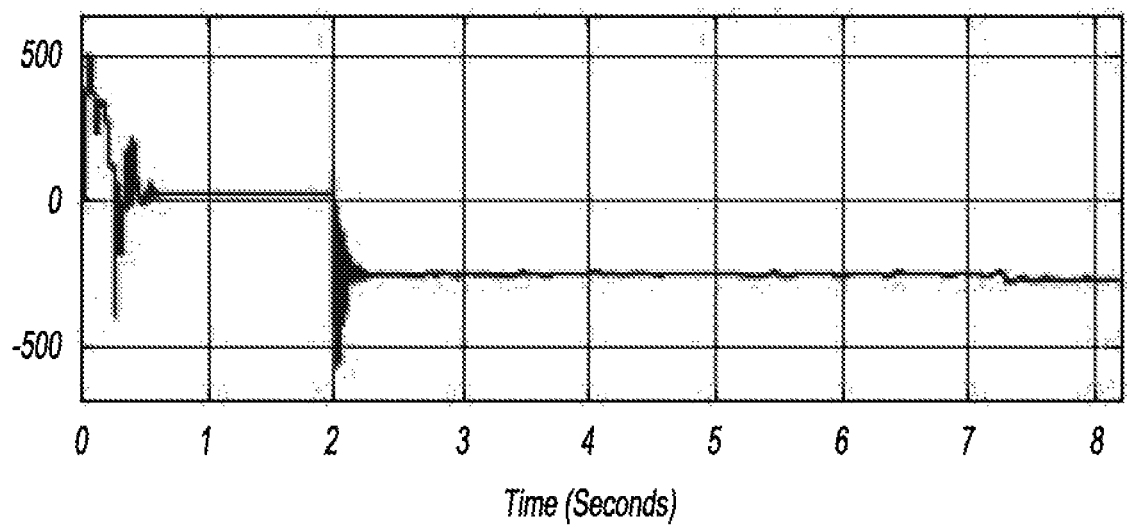
FIGS. 16-16H are a series of graphs that illustrate braking control results during an anti-lock braking event that utilized an open loop based non-zero regenerative braking torque input.
Figure 16B:
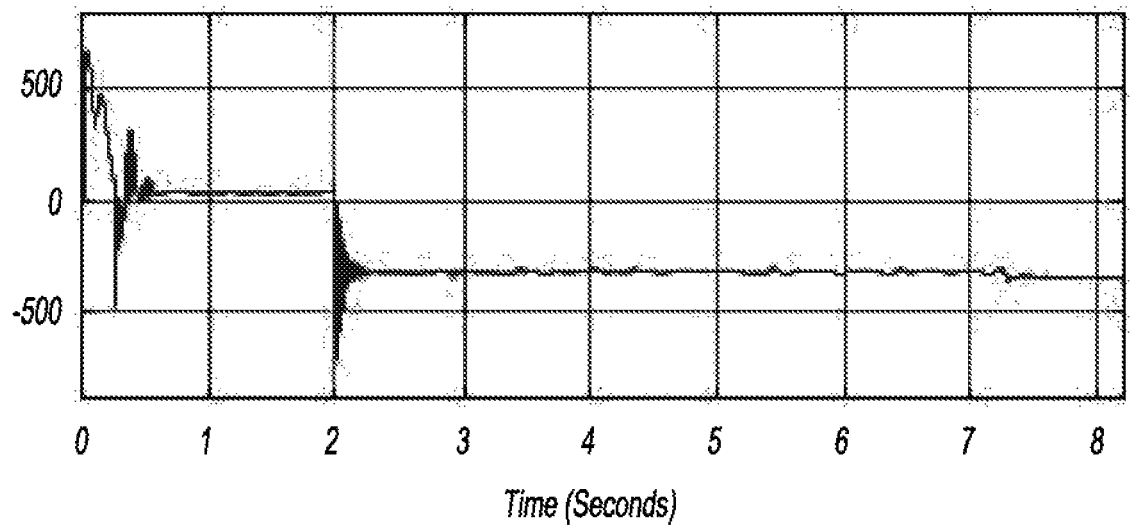
Figure 16C:
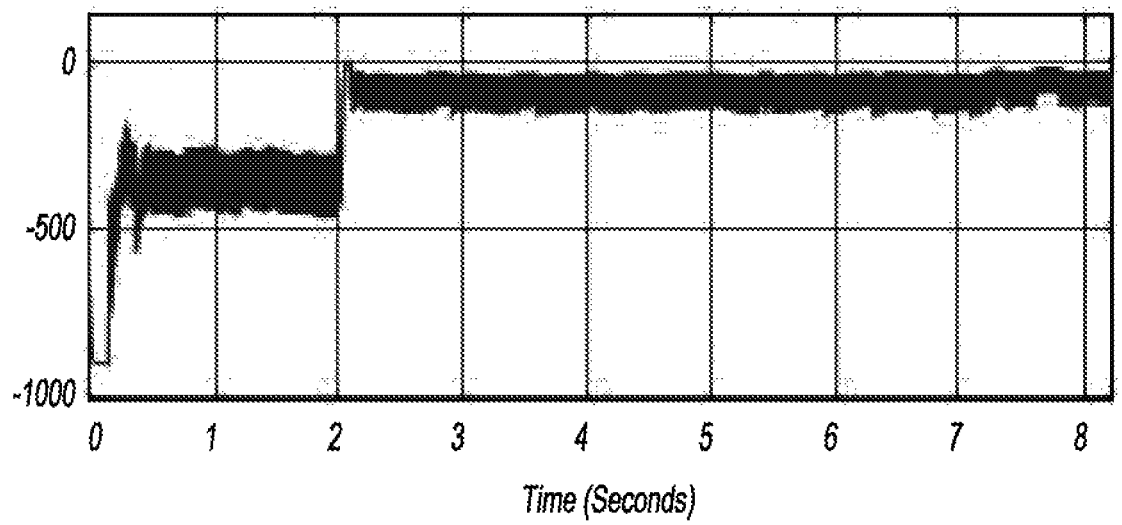
Figure 16D:
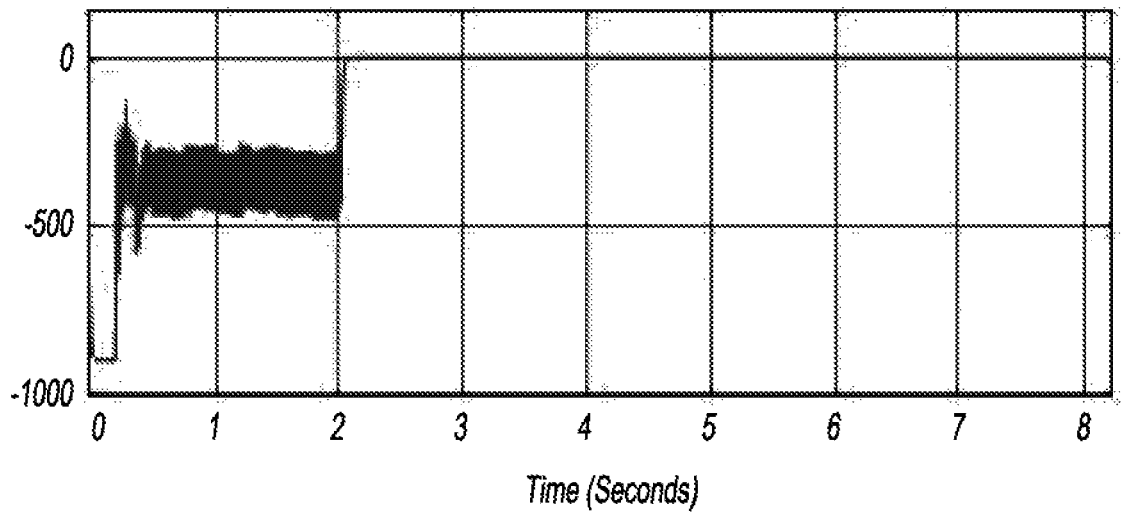
Figure 16E:
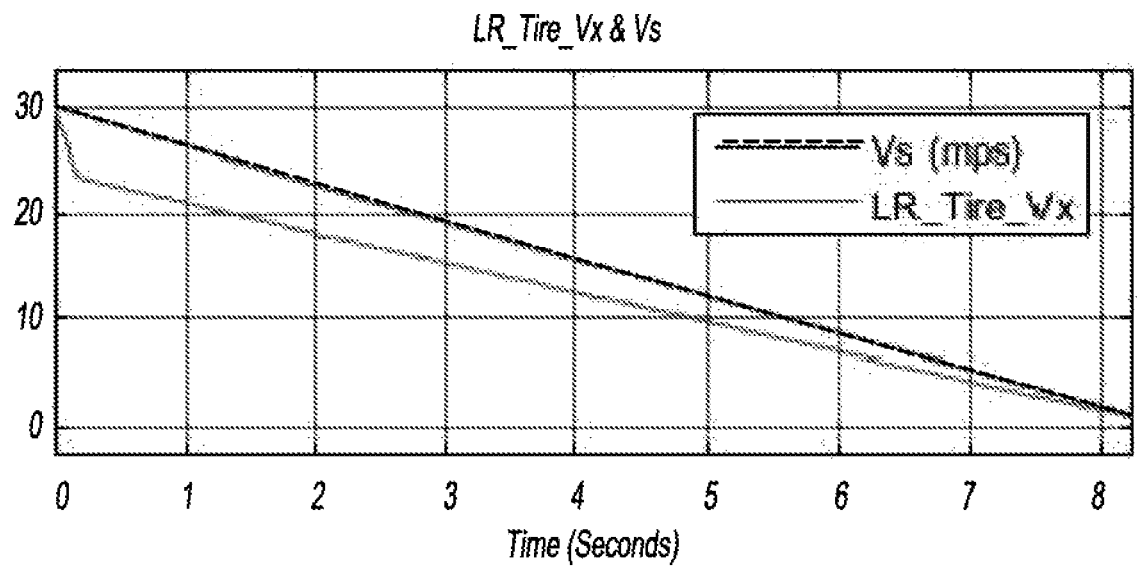
Figure 16F:
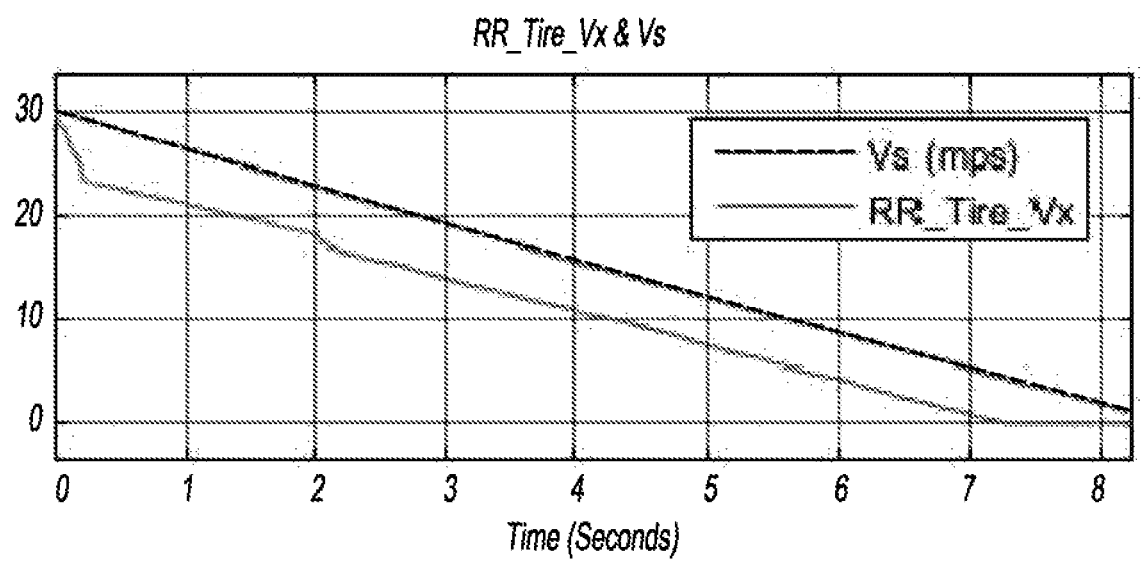
Figure 16G:
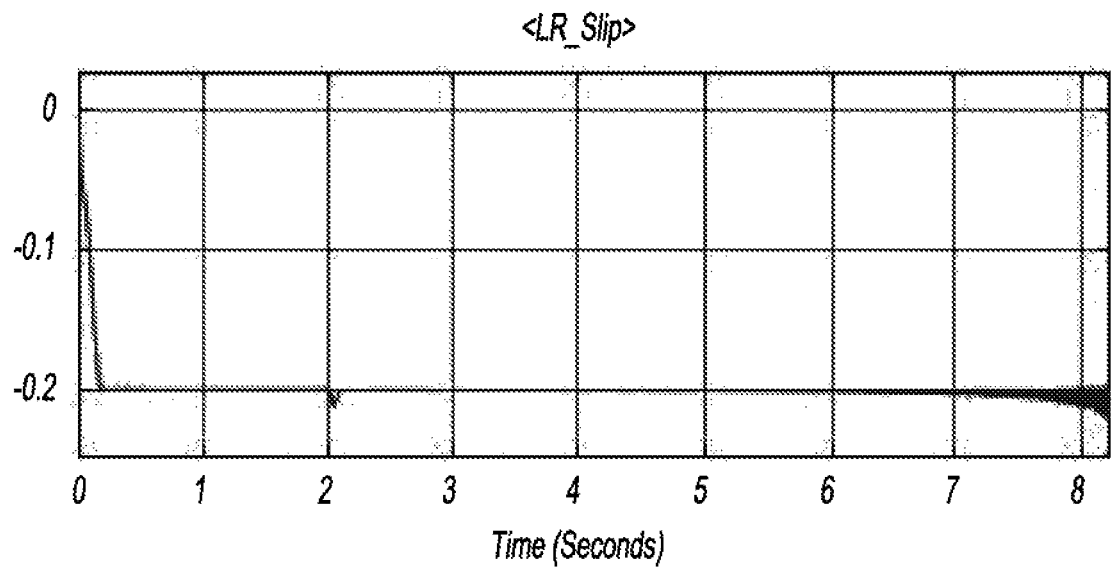
Figure 16H:
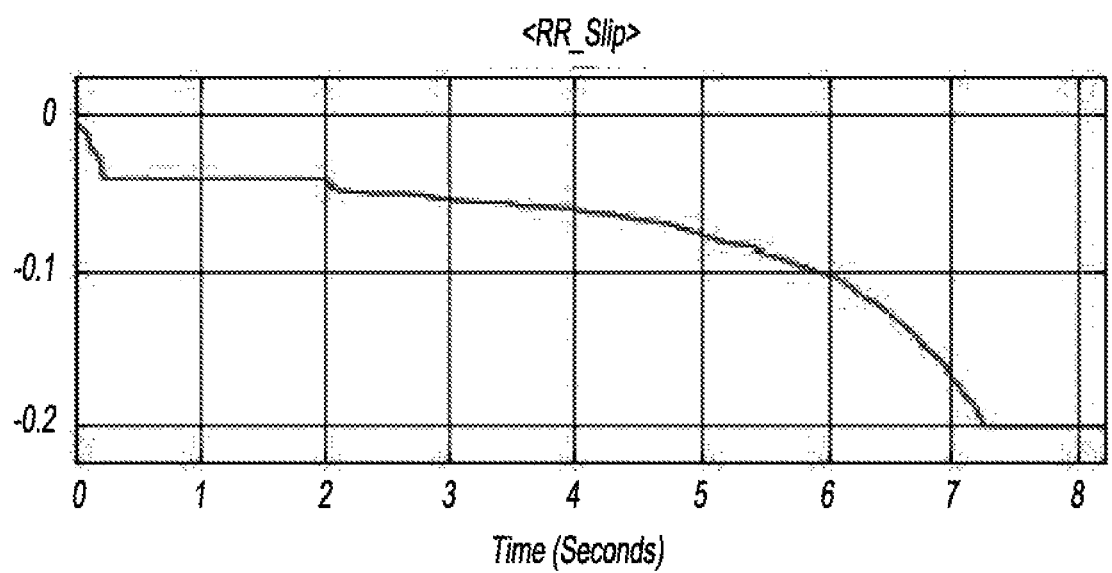
Figure 17A:
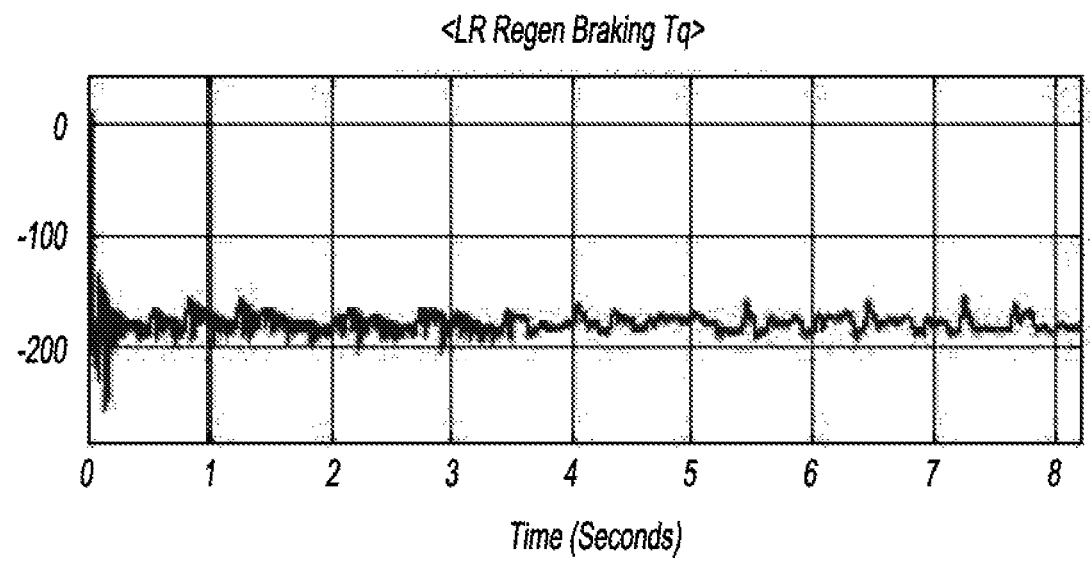
FIGS. 17A-17H are a series of graphs that illustrate braking control results during an anti-lock braking event that utilized a closed loop based RBS-ABS event control to control regenerative braking torque and friction brake torque.
Figure 17B:
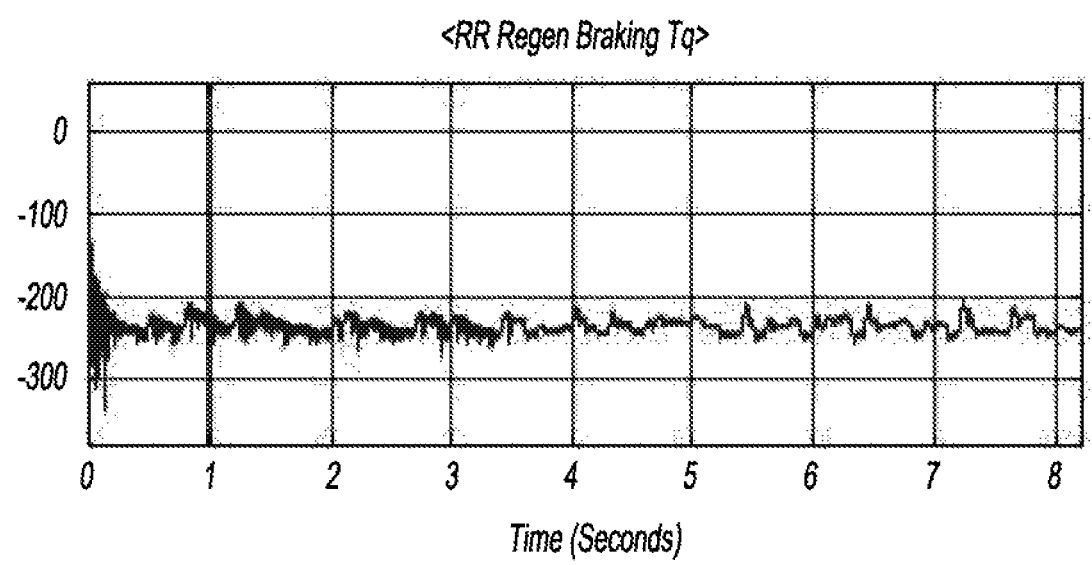
Figure 17C:
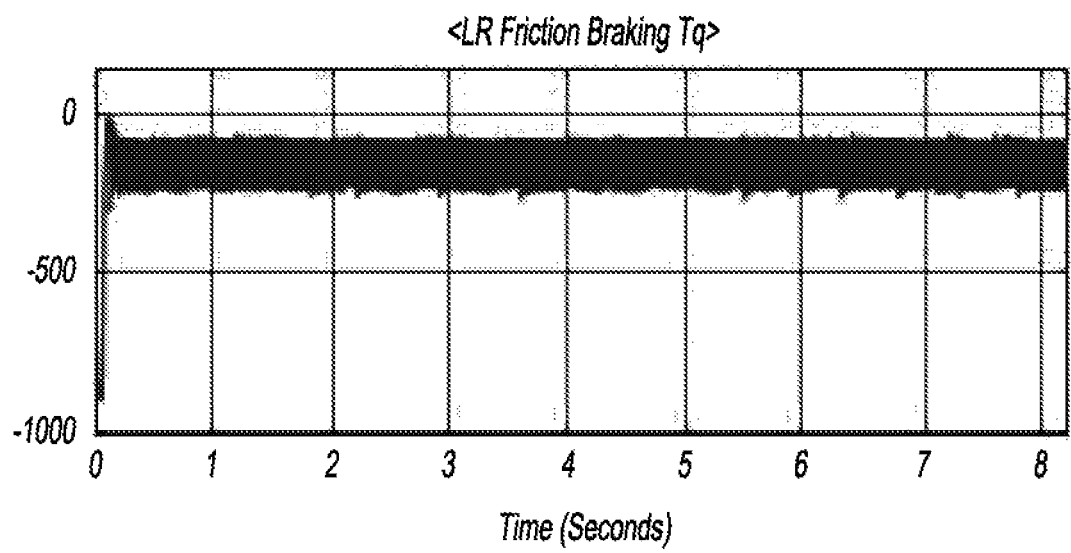
Figure 17D:
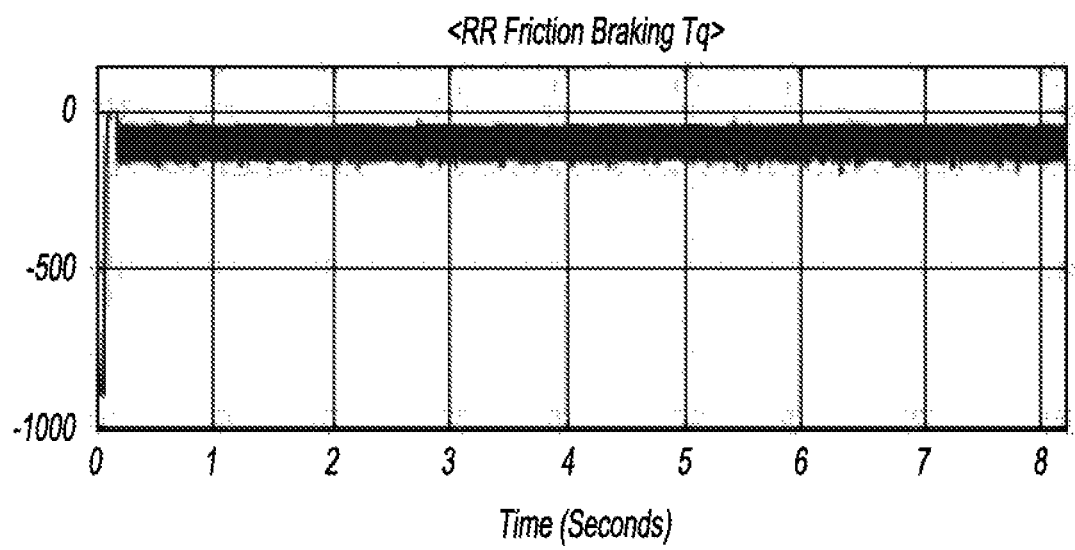
Figure 17E:
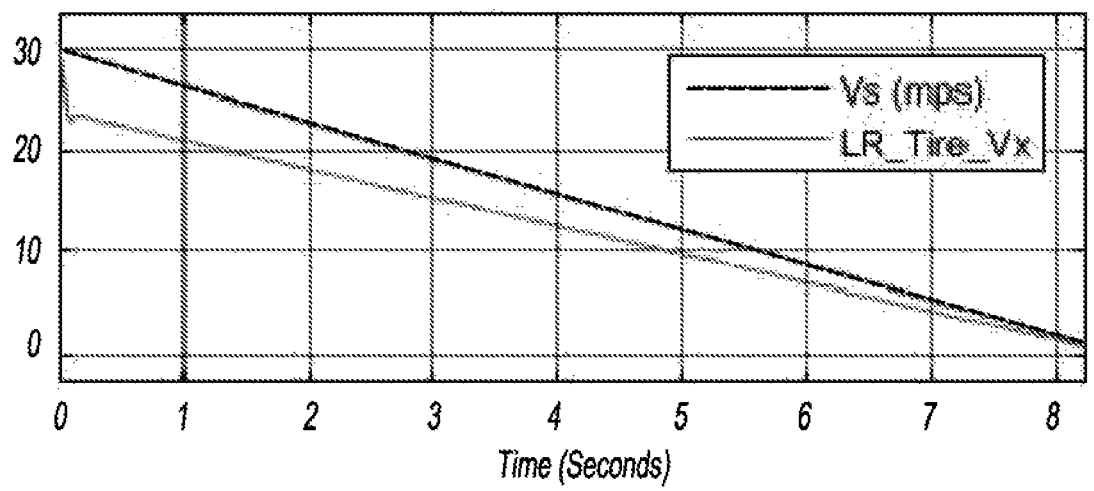
Figure 17F:
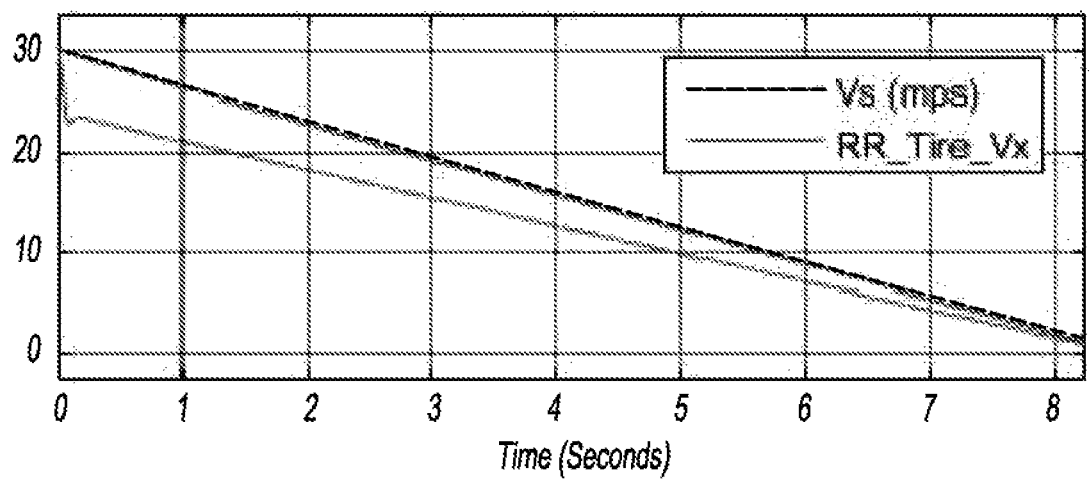
Figure 17G:
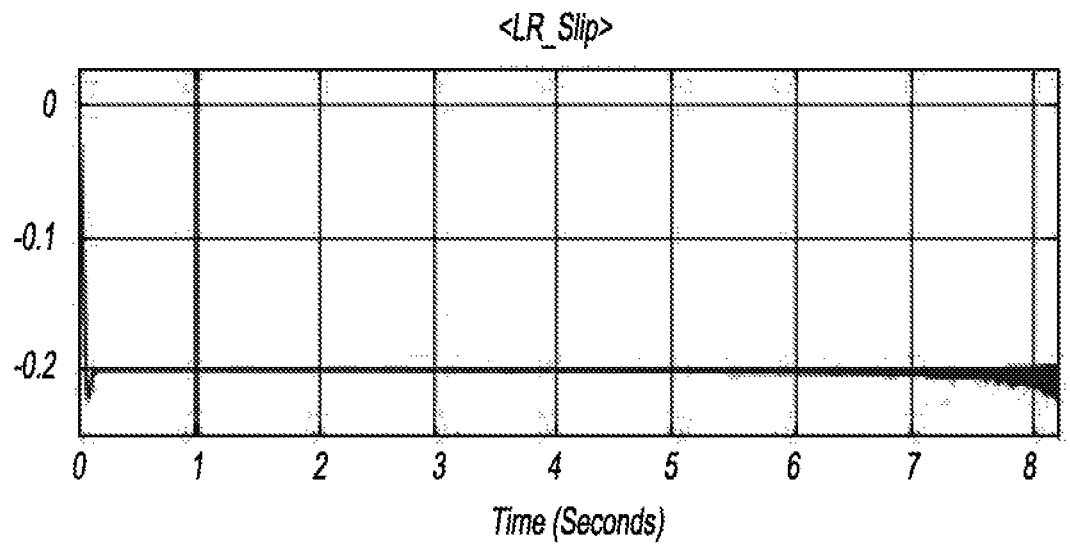
Figure 17H:
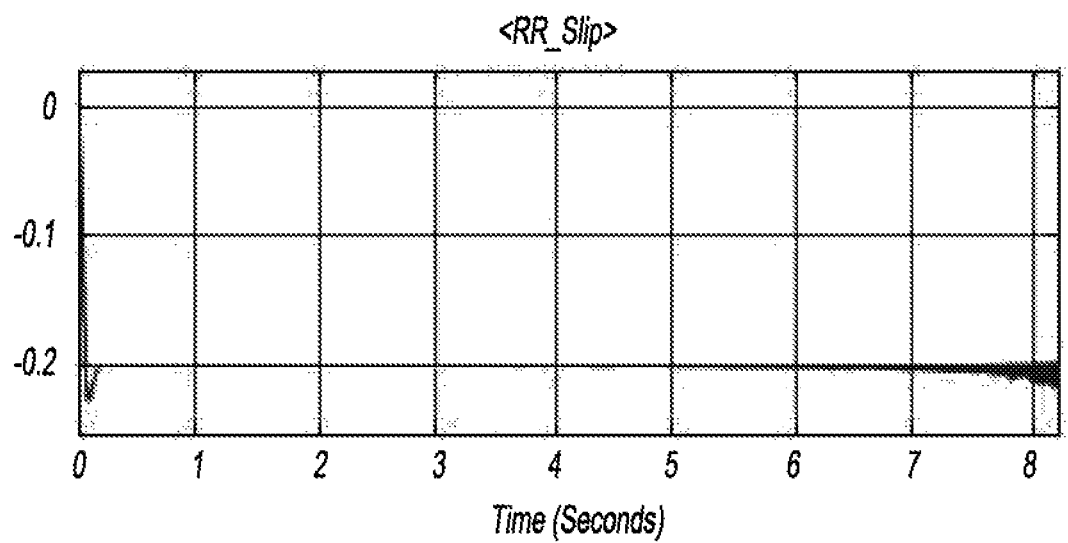

The second method (hereinafter referrer to method 2), which is represented by the flowchart 800 in FIG. 14, includes determining the weighting coefficient $\alpha_r$ according to a characteristic of a typical ABS control that does not include controlling regenerative braking (e.g., according to the closed loop control in FIG. 6 without a regenerative braking input). The static relationship of friction braking torque $T_{brake}(0)$ and its control variable u(0) can be characterized in the original ABS control system (i.e., the typical ABS control that does not include controlling regenerative braking). According to the static characteristic of $T_{brake}(0)$ vs. u(0), the static braking torque value $T_{brake}(0)$ can be determined from value u(0). The basic idea of method 2 is to the apply ABS control without regenerative braking (e.g., according to the closed loop control in FIG. 6 without a regenerative braking input) for a few sampling steps ahead of an RBS-ABS event control in order to determine how much friction braking torque can be replaced by regenerative braking torque.

An initial value of $\alpha_r$ is set to be zero or $\alpha_r(0)$ at block 802. The initial value of either $\alpha_{bL}$ or $\alpha_{bR}$ will be equal to $1-\alpha_r$ as illustrated in block 804. The initial $\alpha_r(0)$ can be set based on in the lowest coefficient of friction between the tire and the road surface μ such that a very small amount regenerative braking torque is generated. It means that the most of braking torque is generated by the friction ABS control channel. The initial value of the control variable u(0), which may be representative of a signal that is indicative of a total torque demand, that correlates with the initial value of the weighting coefficient $\alpha_r(0)$ is monitored at block 802. The monitored value control the variable u compared to a pre-defined $T_{brake}(0)$ vs. u(0) table at block 806 so that a friction braking only torque $T_{brake}(0)$, that would satisfy the entire braking torque demand is determined at block 808. Next, how much brake torque can be replaced by regenerative braking torque by increasing the weighting coefficient $\alpha_r$ value is calculated. At decision block 810, if the maximum regenerative braking torque $T_{regen-max}$<a total barking torque demand (which correlates with $T_{brake}(0)$), $\alpha_r$ is increased to 1 from $\alpha_r(0)$ at block 812. The maximum regenerative braking torque $T_{regen-max}$ of the electric machine or motor (e.g., M/G 18) may be obtained from its torque-speed characteristic curve of the particular electric machine or motor. At decision block 810, if the maximum regenerative braking torque $T_{regen-max}$<the total barking torque demand (which correlates with $T_{brake}(0)$), $\alpha_r$ is increased to $\alpha_r=\Delta\alpha_r+\alpha_r(0)$ at block 814, where $\Delta\alpha_r=T_{regen-max}/(T_{brake}(0))$. The adjusted value of either $\alpha_{bL}$ or $\alpha_{bR}$, after $\alpha_r$ has been adjusted at block 814, will be equal to $1-\alpha_r$ as illustrated in block 816, relative to the value of $\alpha_r$ after being at block 814. The relationship of braking torque $T_{brake}(0)$ vs u(0) at block 806 may be expressed a lookup table or an algorithm of fuzzy logic basal on the ABS-only test data.

The control system described herein introduces a variable conversion that converts two friction braking torque control input variables, $u_{brakeL}$ and $u_{brakeR}$, and a regen braking torque control input variable, $u_{regen}$, from two common input variables, $u_R$ and $u_L$, which are input into the 3-2 variable conversion block via the ABS controllers. As a result, the regenerative braking torque is converted from a disturbance torque variable to an effective control input variable for the RBS-ABS event control system. The control system also compensates for the asymmetry of the left and right wheel delivery torques cause by the asymmetry of the axial driveline shafts (e.g., half shafts 44).

Simulated testing results of the RBS-ABS event control system (e.g., 500) are illustrated in FIGS. 15-17. Three simulation tests were conducted. The first simulation test illustrates ABS control only without regenerative braking torque input. The second simulation test illustrates non-zero regenerative braking torque effect for ABS Control where an open loop based regenerative braking torque is added to ABS. The third simulation test illustrates an RBS-ABS event control where regenerative braking and friction braking are controlled (e.g., 500). The test results illustrate that RBS-ABS event control is an effective solution of integrating regen braking torque and friction braking torque during ABS event to satisfy desired wheel slip with same level of stop distance in comparison with that of ABS control only.

FIGS. 15A-15H illustrate the simulation test curves of the ABS event without regenerative braking torque input. The test curves of two rear wheels are shown since the electric motor delivers regenerative braking torque to the rear wheels by an open differential in the vehicle. The test curves of left and right wheels include: torque acted on axles (which is referred as regenerative braking torques) [Nm], friction braking torques [Nm], vehicle speed and wheel speeds [mps], and wheel slip ratios. The left wheel/tire and the right wheel/tire are a on road surface where the coefficient of friction between the tire and the road surface µ is low and the static value in the slip-friction curve (i.e., the slip ratio λ) is 0.2.

As shown in FIGS. 15A-15H, the initial vehicle speed value is 30 [mps]. During braking, ABS control maintains the wheel slip ratio at the reference value −0.2. It is noticed that the regenerative braking torque displays a different initial dynamic response from that of the friction braking torque. This is because of an initial vehicle speed 30 [mps] is setup in the vehicle model, the other initial values of controlled plant model and controller do not match with this initial value. It is also noticed that the steady-state value of the regenerative braking torque is a positive value which is affected by compliance between tires and driveline. Strictly speaking, the results in FIGS. 15A-15H do not represent regenerative braking torque but rather a reaction torque on axles when the regenerative braking torque command is zero (this is why it is referred as the torque on the axle above).

FIGS. 16A-16H illustrate the simulation test curves of the open loop based non-zero regenerative bake torque effect for ABS control. When the ABS is activated, an open loop regenerative braking torque is added to ABS control system (e.g., the system of FIG. 6). The regenerative braking torque may increase the wheel slip during the ABS operation. FIGS. 16A-16H illustrate the simulation results. At t=2, a regenerative braking toque $T_{regen}$=350 (Nm) is added. As a result, wheel slipping occurred on the right wheel because of the different lengths of the half shafts (e.g., half shafts 44) on the axle, which are represented by transfer functions $D_L(s)$ and $D_R(s)$, even though the coefficient of friction between the right tire and the road surface and the coefficient of friction between left tire and the road surface were the same. The longer of the half shafts delivered more regenerative braking torque. This verifies that regenerative braking torque's effect as a disturbance when controlled via an open loop (e.g., when controlled according to system of FIG. 6).

FIGS. 17A-17H illustrate the simulation results under the same test conditions as illustrated in FIGS. 16A-16H. When the ABS is activated at t=0, a RBS-ABS control is applied (e.g., 500). The regenerative braking torque and friction braking torque are integrated during vehicle braking operation, and wheel slip ratios are maintained at the required value −0.2. The vehicle stability is maintained and stop distance is in the same level as compared with FIGS. 16A-16H. The results illustrate that regenerative braking torque of the left axle shaft (e.g., left half shaft 44) is 75% than dial of right axle shaft (e.g., right half shaft 44). When the RBS-ABS event controller is utilized, regenerative and friction braking torque distribution and integration in both the right and left wheels are automatically implemented by The RBS-ABS event controller. The RBS-ABS event controller automatically adjusts regenerative braking and friction braking control variables to maintain required slip value of −0.2 under the conditions of system stability.

FIGS. 17A-17H illustrate the simulation results under the same test conditions as illustrated in FIGS. 15A-15H. When the ABS is activated at t=0, a RBS-ABS control is applied (e.g., 500). The regenerative braking torque and friction braking torque are integrated during vehicle braking operation, and wheel slip ratios are maintained at the required value −0.2. The vehicle stability is maintained and stop distance is in the same level comparing with FIGS. 15A-15H.

All of the methods, flowcharts, block diagrams, graphs, etc. described herein and depicted in any of the FIGS. 2-14 may be stored as control logic and/or an algorithms within the controller 50. The controller 50 may implement the methods, flowcharts, block diagrams, graphs, etc. described herein by controlling the various components of the vehicle 10.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an axle having an open differential, an input shaft to the differential, and first and second output shafts from the differential, wherein the first and second output shafts are asymmetrical;
   an electric machine secured to the input shaft and configured to recharge a battery during regenerative braking;
   first and second wheels secured to the first and second output shafts, respectively;
   first and second friction brakes configured to apply torque to the first and second wheels, respectively, to slow the vehicle; and
   a controller programmed to, in response to and during an anti-locking braking event,
   generate a first signal indicative of a braking torque demand at the first wheel based on a difference between a desired wheel slip ratio and an actual wheel slip ratio of the first wheel,
   generate a second signal indicative of a braking torque demand at the second wheel based on a difference between a desired wheel slip ratio and an actual wheel slip ratio of the second wheel,
   adjust a generative braking torque of the electric machine based on a product of the first signal and a regenerative braking weighting coefficient to maintain or drive actual wheel slip at or toward the desired wheel slip, adjust a first friction braking torque of the first friction brake based on a product of the first signal and a friction braking weighting coefficient to maintain or drive actual wheel slip at or toward the desired wheel slip, and adjust a second friction braking torque of the second friction brake based on the second signal and transfer functions that represent dynamics of the first and second output shafts.

2. The vehicle of claim 1, wherein the transfer functions include first and second transfer functions represent the dynamics of the first and second output shafts, respectively, and wherein the controller is programmed to adjust the second friction braking torque of the second friction brake based on a difference between the second signal and a product of the first signal, the regenerative braking weighting coefficient, and a difference between one and a ratio between the second transfer function to the first transfer function.

3. The vehicle of claim 1, wherein the regenerative braking torque is further adjusted by a pre-compensator.

4. The vehicle of claim 3 further comprising and transmission disposed between the electric machine and the input shaft, wherein the pre-compensator is based on transfer functions that represents dynamics of the friction brakes, dynamics of the electric machine, dynamics of the input shaft and transmission, and dynamics of the first output shaft.

5. The vehicle of claim 1, wherein the first friction braking torque is further adjusted by a pro-compensator.

6. The vehicle of claim 5 further comprising and transmission disposed between the electric machine and the input shaft, wherein the pre-compensator is based on transfer functions that represents dynamics of the friction brakes, dynamics of the electric machine, dynamics of the input shaft and transmission, and dynamics of the first output shaft.

7. The vehicle of claim 1, wherein the regenerative braking torque is further adjusted based on a transfer function that represents dynamics of the electric machine.

8. The vehicle of claim 1 further comprising and transmission disposed between the electric machine and the input shaft, wherein the regenerative braking torque is further adjusted based on a transfer function that represents dynamics of the input shaft and transmission.

9. The vehicle of claim 1, wherein the first friction braking torque is further adjusted based on a transfer function that represents dynamics of an actuation system of the first friction brake.

10. The vehicle of claim 1, wherein the second friction braking torque is further adjusted based on a transfer function that represents dynamics of an actuation system of the second friction brake.

11. A vehicle comprising:
a drivetrain having a transmission, a differential, an input shaft to the differential, first and second output shafts from the differential, wherein an output of the transmission is connected to the input shaft and the first and second output shafts are asymmetrical;
an electric machine secured to an input of the transmission and configured to recharge a battery during regenerative braking;
first and second wheels secured to the first and second output shafts, respectively;
first and second friction brakes configured to apply torque to the first and second wheels, respectively, to slow the vehicle; and
a controller programmed to, in response to and during an anti-locking braking event,
generate a first signal indicative of a braking torque demand at the first wheel based on a difference between a desired wheel slip ratio and an actual wheel slip ratio of the first wheel,
generate a second signal indicative of a braking torque demand at the second wheel based on a difference between a desired wheel slip ratio and an actual wheel slip ratio of the second wheel,
adjust a regenerative braking torque of the electric machine based on a product of the first signal and a regenerative braking weighting coefficient to maintain or drive actual wheel slip at or toward the desired wheel slip, wherein the regenerative braking weighting coefficient is based on a ratio between a maximum braking torque of the electric machine and the total torque demand,
adjust a first friction braking torque of the first friction brake based on a product of the first signal and a friction braking weighting coefficient to maintain or drive actual wheel slip at or toward the desired wheel slip, and
adjust a second friction braking torque of the second friction brake based on the second signal and transfer functions that represent the dynamics of the first and second output shafts.

12. The vehicle of claim 11, wherein the transfer functions include first and second transfer functions represent the dynamics of the first and second output shafts, respectively, wherein the controller is programmed to adjust the second friction braking torque of the second friction brake based on a difference between the second signal and a product of the first signal, the second weighting coefficient, and a difference between one and a ratio of the second transfer function to the first transfer function.

13. The vehicle of claim 11, wherein the regenerative braking torque is further adjusted by a pre-compensator.

14. The vehicle of claim 13 wherein the pre-compensator is based on transfer functions that represents dynamics of the friction brakes, dynamics of the electric machine, dynamics of the input shaft and transmission, and dynamics of the first output shaft.

15. The vehicle of claim 11, wherein the first friction braking torque is further adjusted by a pre-compensator.

16. The vehicle of claim 15 wherein the pre-compensator is based on transfer functions that represents dynamics of the friction brakes, dynamics of the electric machine, dynamics of the input shaft and transmission, and dynamics of the first output shaft.

17. A vehicle comprising:
a drivetrain having a driveshaft and first and second half shafts, wherein the first and second half shaft are asymmetrical;
first and second wheels secured to the first and second half shafts, respectively;
an electric machine connected to the driveshaft;
first and second friction brakes connected to the first and second wheels, respectively; and
a controller programmed to, in response to and during an anti-locking braking event,
generate a first signal indicative of a braking torque demand at the first wheel based on a difference between a desired wheel slip ratio and an actual wheel slip ratio of the first wheel, generate a second signal indicative of a braking torque demand at the second wheel based on a difference between a desired wheel slip ratio and an actual wheel slip ratio of the second wheel, determine a regenerative braking weighting coefficient based on a ratio between a maximum braking torque of the electric machine and a braking torque threshold that corresponds with the wheels becoming locked, determine a friction braking weighting coefficient based on the regenerative braking weighting coefficient, adjust a regenerative braking torque of the electric machine based the first signal and the regenerative braking weighting coefficient during the anti-lock braking event to maintain or drive actual wheel slip at or toward the desired wheel slip, adjust a first friction braking torque of the first friction brake based on the first signal and the friction braking weighting coefficient weighting coefficient, and adjust a second friction braking torque of the second friction brake based on the second signal and transfer functions that represent the dynamics of the first and second half shafts.

18. The vehicle of claim 17, wherein first and second transfer functions represent the dynamics of the first and second half shafts, respectively, and wherein the controller is programmed to adjust the second friction braking torque of the second friction brake based on a difference between the second signal and a product of the first signal, the regenerative braking weighting coefficient, and a difference between one and a ratio between the second transfer function to the first transfer function.

19. The vehicle of claim 17, wherein the regenerative braking torque is further adjusted by a pre-compensator, and wherein the pre-compensator is based on transfer functions that represents dynamics of the friction brakes, dynamics of the electric machine, dynamics of the driveshaft, and dynamics of the first half shaft.

20. The vehicle of claim 17, wherein the first friction braking torque is further adjusted by a pre-compensator, and wherein the pre-compensator is based on transfer functions that represents dynamics of the friction brakes, dynamics of the electric machine, dynamics of the driveshaft, and dynamics of the first half shaft.

* * * * *